(12) United States Patent
Juhasz et al.

(10) Patent No.: US 9,778,036 B2
(45) Date of Patent: Oct. 3, 2017

(54) SWITCHABLE FRONT-END MEASUREMENT UNIT FOR TOWED MARINE ELECTROMAGNETIC STREAMER CABLES

(71) Applicant: PGS Geophysical AS, Oslo (NO)

(72) Inventors: Robert Juhasz, Hägersten (SE); U. Peter Lindqvist, Segeltorp (SE); Gustav Göran Mattias Südow, Houston, TX (US)

(73) Assignee: PGS Geophysical AS, Oslo (NO)

( * ) Notice: Subject to any disclaimer, the term of this patent is extended or adjusted under 35 U.S.C. 154(b) by 440 days.

(21) Appl. No.: 14/282,398

(22) Filed: May 20, 2014

(65) Prior Publication Data

US 2014/0253132 A1    Sep. 11, 2014

Related U.S. Application Data

(63) Continuation-in-part of application No. 12/799,528, filed on Apr. 27, 2010, now abandoned.

(51) Int. Cl.
*G01C 13/00* (2006.01)
*G01V 3/08* (2006.01)

(52) U.S. Cl.
CPC ............ *G01C 13/00* (2013.01); *G01V 3/083* (2013.01)

(58) Field of Classification Search
CPC . G01V 3/083; G01V 3/12; G01V 3/15; G01V 1/38; G01V 1/201
USPC ........................................................ 324/365
See application file for complete search history.

(56) References Cited

U.S. PATENT DOCUMENTS

| | | |
|---|---|---|
| 2,838,731 A | 7/1953 | Cruzan et al. |
| 3,182,250 A | 5/1965 | Mayes |
| 4,298,840 A | 11/1981 | Bischoff et al. |
| 6,493,636 B1 * | 12/2002 | DeKok ............... G01V 1/3861 367/20 |
| 6,628,119 B1 | 9/2003 | Eidesmo et al. |
| 6,674,286 B2 | 1/2004 | Lagmanson |

(Continued)

FOREIGN PATENT DOCUMENTS

| | | |
|---|---|---|
| EP | 2204673 A2 | 7/2010 |
| EP | 2211204 A2 | 7/2010 |

(Continued)

OTHER PUBLICATIONS

Kemlon BMS Glass Sealed feed thru Brochure, retrieved from http://www.kemlon.com/catalogs/kemtite/bms.htm, Copyright 1999.

*Primary Examiner* — Patrick Assouad
*Assistant Examiner* — Christopher McAndrew

(57) ABSTRACT

Electromagnetic streamer cables and methods of use. Example systems include: a first electrode, the first electrode at a first location along the streamer cable; a second electrode at a second location along the streamer cable; a first sensor module electrically coupled to the first electrode and second electrode, the first sensor module configured to measure a voltage across the first and second electrodes; a third electrode at a third location between the first and second electrodes; a fourth electrode at a fourth location along the streamer cable, the fourth location distal to the second location; and a second sensor module electrically coupled to the third electrode and fourth electrode, the second sensor module configured to measure a voltage across the third and fourth electrodes.

24 Claims, 10 Drawing Sheets

(56) References Cited

U.S. PATENT DOCUMENTS

| | | | | |
|---|---|---|---|---|
| 7,446,535 | B1 * | 11/2008 | Tenghamn | G01V 3/083 174/101.5 |
| 7,453,763 | B2 | 11/2008 | Johnstad | |
| 7,548,486 | B2 * | 6/2009 | Tenghamn | G01V 1/201 367/154 |
| 7,602,191 | B2 * | 10/2009 | Davidsson | G01V 3/083 324/347 |
| 7,671,598 | B2 * | 3/2010 | Ronaess | G01V 1/201 324/365 |
| 8,098,542 | B2 * | 1/2012 | Hillesund | G01V 1/38 367/153 |
| 8,736,269 | B2 | 5/2014 | Südow et al. | |
| 2006/0238200 | A1 * | 10/2006 | Johnstad | G01V 1/201 324/337 |
| 2009/0243616 | A1 | 10/2009 | Loehken et al. | |
| 2010/0017133 | A1 * | 1/2010 | Ziolkowski | G01V 3/12 702/7 |
| 2010/0045296 | A1 * | 2/2010 | Tenghamn | G01V 3/083 324/348 |
| 2011/0158043 | A1 * | 6/2011 | Johnstad | G01V 1/201 367/16 |

FOREIGN PATENT DOCUMENTS

| | | | |
|---|---|---|---|
| GB | 2436709 A | 10/2007 | |
| WO | 2009003604 A3 | 1/2009 | |
| WO | 2009032274 A1 | 3/2009 | |

\* cited by examiner

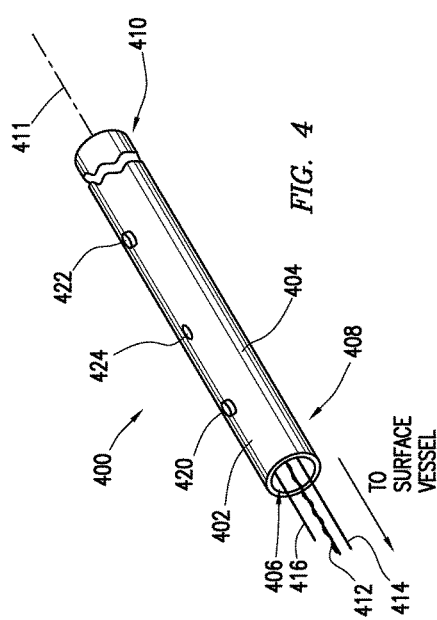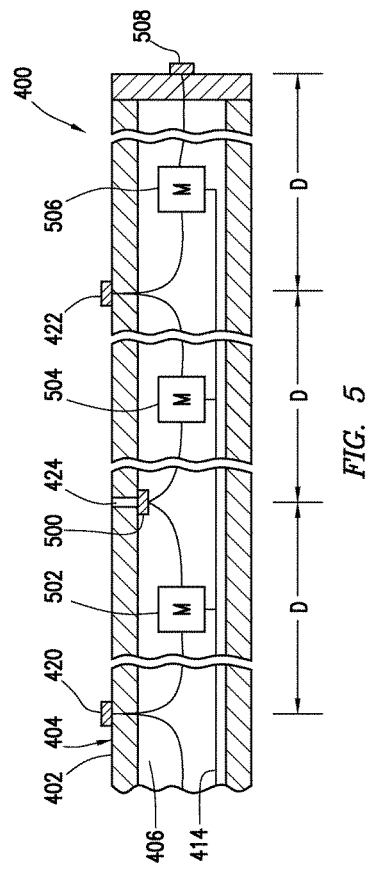

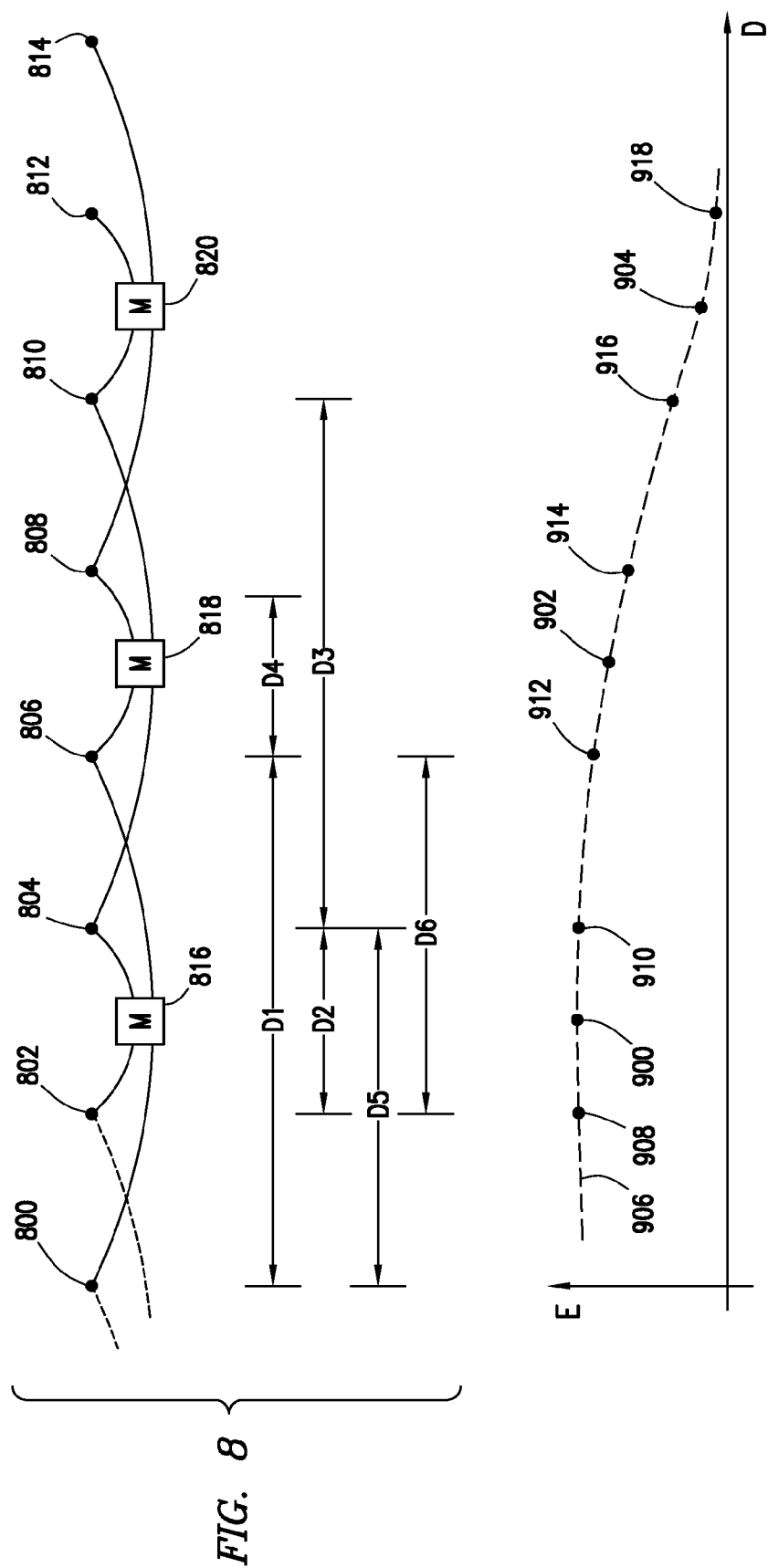

SWITCHABLE FRONT-END MEASUREMENT UNIT FOR TOWED MARINE ELECTROMAGNETIC STREAMER CABLES

CROSS-REFERENCE TO RELATED APPLICATIONS

This disclosure claims the benefit of U.S. application Ser. No. 12/799,528, filed Apr. 27, 2010, titled "Switchable Front-End Measurement Unit for Towed Marine Electromagnetic Survey Cables", which is incorporated by reference herein as if reproduced in full below.

BACKGROUND

The various embodiments relate to the field of marine electromagnetic survey methods and related systems. More specifically, various embodiments relate to electromagnetic survey streamer cables that can be electrically reconfigured to have selectable receiver spacing and offset.

Marine controlled source electromagnetic (CSEM) surveying is a geophysical surveying technique that uses electromagnetic (EM) energy to identify possible hydrocarbon bearing rock formations below the bottom of a body of water such as a lake or the ocean. In a typical marine CSEM survey, an EM source and a number of EM sensors are located within a body of water. The EM source is typically towed over an area of interest in the Earth's subsurface, and the sensors located over the area of interest to obtain signals related to the distribution of electrical resistivity in the subsurface area of interest. Such surveying may be performed for a range of EM source and EM sensor positions. The EM source emits either or both a time varying electric field and a time varying magnetic field, which propagate outwardly into the overlying seawater and downwardly into the formations below the water bottom. The sensors may detect and record the induced electric field. The time varying EM field may be induced by passing electric current through an antenna. The electric current may be continuous wave and have one or more discrete frequencies. Such current passing through an antenna is used for what is referred to as "frequency domain CSEM" surveying. In other situations, direct current is applied to an antenna, and transient EM fields are produced by switching the current. Such switching may include, for example, switching on, switching off, inverting polarity, and inverting polarity after a switch-on or switch-off event. Such switching may be sequenced in time, for example, equally time spaced, or in a time series known as a "pseudo random binary sequence." Such switched current is used to conduct what is referred to as a "transient CSEM" survey.

The EM energy is rapidly attenuated in the conductive seawater, but in less conductive subsurface formations is attenuated less and propagates more efficiently. If the frequency of the EM energy is low enough, the EM energy can propagate deep into the subsurface formations. Energy "leaks" from resistive subsurface layers, e.g., a hydrocarbon-filled reservoir, back to the water bottom. When the source-sensor spacing ("offset") is comparable to or greater than the depth of burial of the resistive layer (the depth below the water bottom) the energy reflected from the resistive layer will dominate over the transmitted energy. CSEM surveying uses the large resistivity contrast between highly resistive hydrocarbons and conductive aqueous saline fluids disposed in permeable subsurface formations to assist in identifying hydrocarbon reservoirs in the subsurface.

The sensor layout in an electromagnetic survey system may consist of spaced apart electrode pairs distributed along the length of the streamer cable. The electrode separation may increase as a function of offset to the electromagnetic source, thus the hardware configuration is changed based on the absolute position at which the measurement node is located.

There continues to be a need for improved configurations of electromagnetic sensor streamer cable that simplify construction and reduce production of unique parts for cost control.

BRIEF DESCRIPTION OF THE DRAWINGS

For a detailed description of exemplary embodiments, reference will now be made to the accompanying drawings in which:

FIG. 4 shows a perspective view of a streamer cable in accordance with further example embodiments;

FIG. 5 shows a cutaway elevation view of the streamer cable of FIG. 4;

FIG. 8 shows, in the shorthand notation, a streamer cable in accordance with further example embodiments;

FIG. 9 shows a plot of electrical field versus distance along a streamer cable;

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Exposed on the exterior surface" of a streamer cable shall mean that, when a streamer cable is submerged, an electrode "exposed on the exterior surface" contacts water. The electrode may be, for example, coupled on the exterior surface, or the electrode may be exposed to the water through an aperture in the exterior surface.

An expressly claimed "first location" and "second location" shall mean different axial locations along a streamer cable. Varying radial positions at a single axial location shall not be considered different axial locations.

"Partially overlap" in reference to distance defined by electrode pairs shall mean that the distance spanned between electrodes of a first electrode pair and a distance spanned between electrodes of a second electrode pair overlap (e.g., an electrode of second electrode pair resides between electrodes of the first electrode pair), but "partially overlap" shall not include the situation of a full overlap.

"About", in relation to a recited distance, shall mean the within +/−10% of the recited distance.

DETAILED DESCRIPTION

Figure 1:
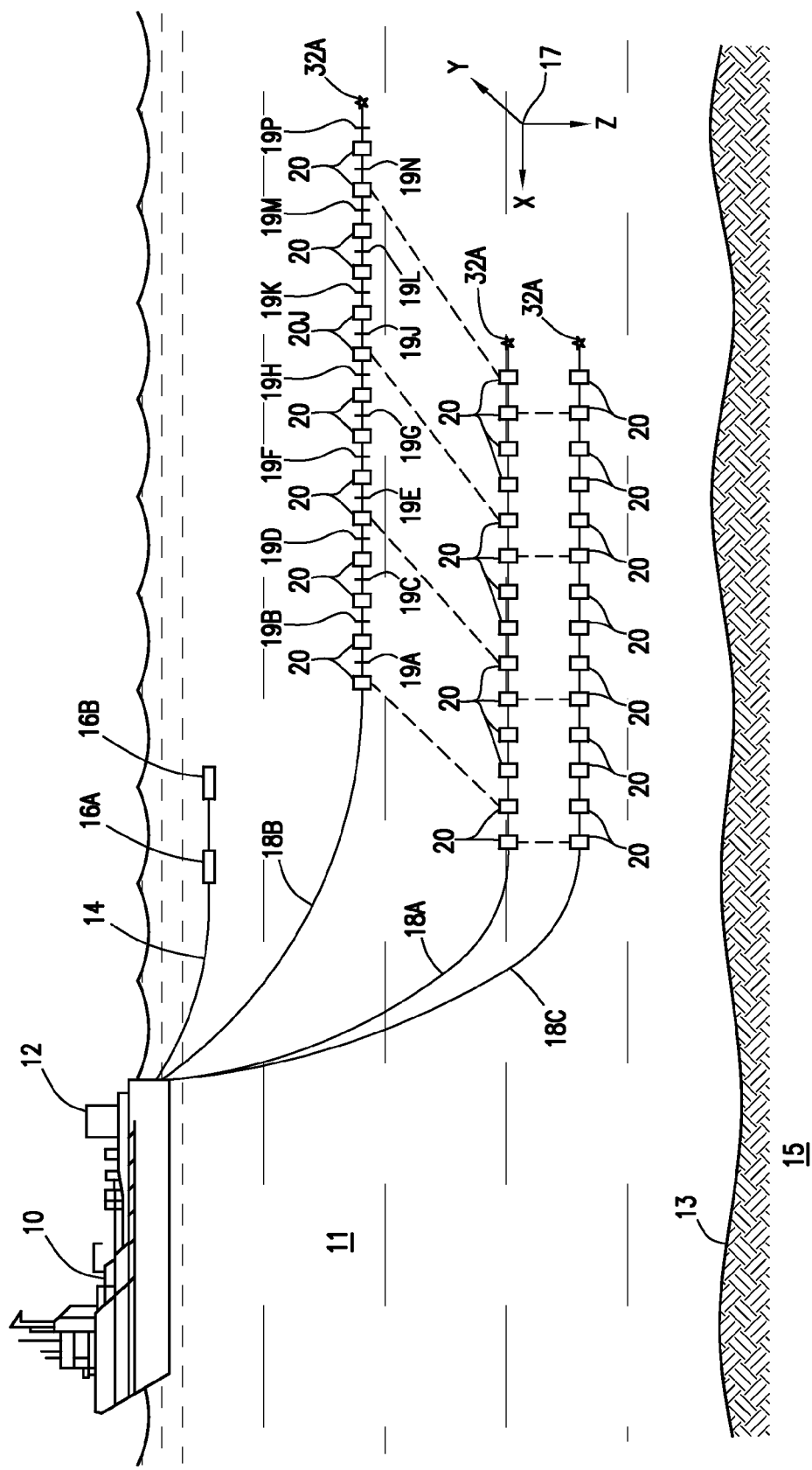
FIG. 1 is a perspective view of an electromagnetic signal acquisition system that may be used in accordance with example embodiments.

FIG. 1 is a perspective view of an electromagnetic signal acquisition system that may be used in accordance with various embodiments. A survey vessel 10 moves along the surface of a body of water 11 such as a lake or the ocean. The survey vessel 10 may include thereon equipment shown at 12 and referred to for convenience as a "recording system." The recording system 12 may include devices (none shown separately in FIG. 1) for navigation of the vessel 10, for imparting electric current to an electromagnetic transmitter (explained below) and for detecting and recoding signals generated by each of a plurality of electromagnetic sensors (explained below) disposed at spaced apart positions along one or more sensor streamer cables, which may be towed by the survey vessel 10 or by another vessel.

The transmitter in the present example may be an armored, insulated electrical cable 14 having thereon spaced apart electrodes 16A, 16B. The cable 14 and electrodes 16A, 16B may be towed by the survey vessel 10 or another vessel. At selected times, the recording system 12 will impart electric current across the electrodes 16A, 16B. The electrical current may be, for example, continuous wave low frequency (e.g., about 0.01 to about 1 Hz) alternating current at one or more discrete frequencies for frequency domain electromagnetic surveying, or some form of switched direct current (e.g. switched on, switched off, reversed polarity or a series of switching events such as a pseudo-random binary sequence) for time domain electromagnetic surveying. An electromagnetic field induced by the current flowing across the electrodes 16A, 16B travels through the water, into rock formations 15 below the water bottom 13 and is detected by electromagnetic sensors disposed in or near sensor modules 20 on the one or more sensor cables. In the present example there may be a first, second and third streamer cable 18A, 18B, 18C, respectively. Each streamer cable 18A, 18B, 18C may in some implementations include an electrode 32A at the aft end thereof (furthest from the vessel 10) exposed to the water 11. The purpose of the aft electrode(s) 32A will be further explained with reference to FIG. 2.

The streamer cable shown at 18B may include a plurality of spaced apart electrodes 19A through 19P disposed on an exterior surface of the cable 18B. The electrodes 19A through 19P are configurable to be selectively electrically connected to one or more signal processing devices inside one or more of the sensor modules 20. As will be explained further below with reference to FIGS. 2 and 3, each sensor module 20 may have circuitry proximate thereto for measuring voltage imparted between an electrode (28 in FIG. 2) disposed on the outer surface sensor module 20 and a reference potential line (32 in FIG. 2) in response to the electromagnetic field imparted into the subsurface by the transmitter. Alternatively, as will be explained with reference to FIG. 3, some of the electrodes 19A to 19P may be selectively connected to signal processing circuits in one or more of the modules (e.g., 20J) by including a switching circuit (FIG. 3) to connect different pairs of the electrodes 19A-19P as input to voltage measuring circuits in the module 20J.

It should also be understood that while the present example transmitter, known as a horizontal electric dipole, uses a pair of electrodes spaced apart in the horizontal plane, other types of transmitters that may be used with the present invention include vertical electric dipoles (electrodes spaced apart in the vertical plane) or vertical or horizontal magnetic dipoles such as wire coils or loops having magnetic moment along the vertical and/or horizontal directions.

FIG. 1 also shows a coordinate system 17 used in the present description and to illustrate that the second streamer cable 18A may be displaced from the first streamer cable 18B in the horizontal plane or Y direction, and the third streamer cable 18C may be displaced from the first streamer cable 18B in the vertical plane or Z direction. The sensor modules 20 on all three streamer cables 18A, 18B, 18C may be positioned at corresponding longitudinal distances from the vessel 10 to simplify calculation of certain measurements.

As will be explained further, the second and third streamer cables 18A, 18C may be used to obtain electric field measurements in the Y and Z directions, called the "crossline" directions, by measuring voltages impressed across corresponding electrodes (i.e., longitudinally about the same distance from the survey vessel 10) on different streamer cables, as well as the so-called "in-line" direction across pairs of electrodes spaced apart in the X direction as explained above. However, the use of additional streamer cables 18A and 18C is optional. The foregoing example is provided to show that using the additional streamer cables to make cross line measurements is a possible feature in some implementations. Each of the other streamer cables 18A and 18C can be configured with electrodes 19A-19P as explained above and with switching circuitry as explained below with reference to FIGS. 2 and 3. Thus, a system as described herein may be selectively configured to operate in 2D or 3D cross line acquisition more, or may be configured to provide variable sensor spacing/variable offset between transmitters and sensors. Each such change in configuration may be performed by operating switches located in one or more of the sensor modules, and need not require substituting different streamer cable components. Still further, only one sensor streamer cable, configured as shown at 18B in FIG. 1 and more fully explained with reference to FIGS. 2 and 3 may be used in other examples. In another example, a plurality of streamer cables spaced apart in the Y-direction and configured as shown at 18B may be used in parallel to increase the area of the subsurface surveyed with any pass of the survey vessel 10 even if cross-line measurements are not made or used.

Figure 2:
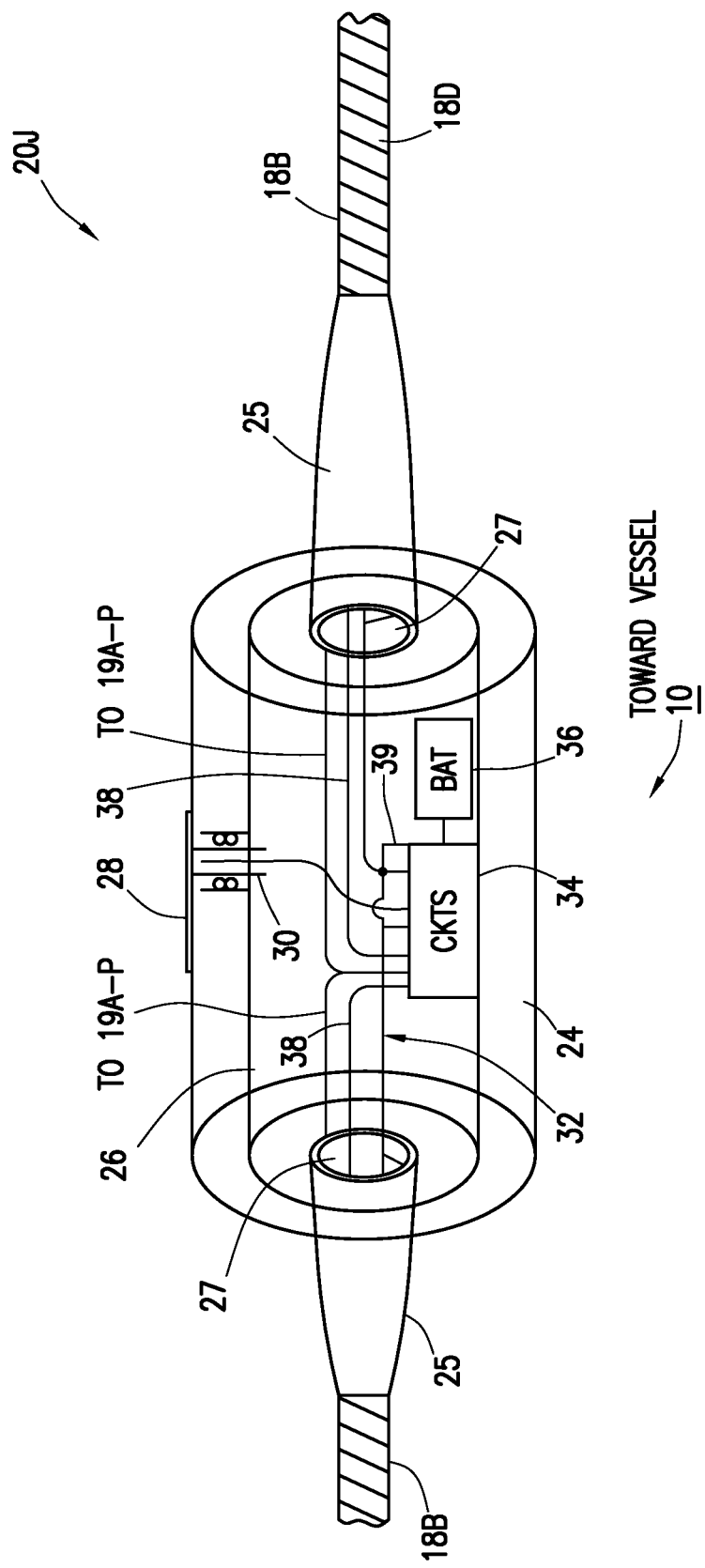
FIG. 2 shows more detail of one example of a sensor module in the cable system of FIG. 1.

One example of a sensor streamer cable 18B and one of the sensor modules 20J including reconfiguration capability shown in more detail in FIG. 2. The streamer cable 18B may include on its exterior helically wound, electrically conductive armor wires 18D, such as may be made from stainless steel or other high strength, corrosion resistant, electrically conductive material. In one example, to be explained in more detail below, the streamer cable 18B may include one or more insulated electrical conductors and one or more optical fibers disposed inside the armor wires 18D. Using an externally armored cable as shown in FIG. 2 may have the advantages of high axial strength of and high resistance to abrasion. In some systems, the armored cable is used as a lead-in portion of a cable as the weight makes the cable negatively buoyant. Other streamer cable constructions are discussed below.

The streamer cable 18B in the present example may be divided into segments, each of which terminates with a combination mechanical/electrical/optical connector 25 ("cable connector") coupled to the longitudinal ends of each cable segment. The cable connector 25 may be any type known in the art to make electrical and/or optical connection, and to transfer axial loading to a mating connector 27. In the present example such mating connector 27 can be mounted in each longitudinal end of one of the sensor modules 20. The connectors 25, 27 resist entry of fluid under pressure when the connectors 25, 27 are coupled to each other.

The sensor module housing 24 is preferably pressure resistant and defines a sealed interior chamber 26 therein. The housing 24 may be made from electrically non-conductive, high strength material such as glass fiber reinforced plastic, and should have a wall thickness selected to resist crushing at the maximum expected hydrostatic pressure expected to be exerted on the housing 24. In other cases, the housing may be made from titanium. The mating connectors 27 may be arranged in the longitudinal ends of the housing 24 as shown in FIG. 2 such that axial loading along the streamer cable 18B is transferred through the sensor module housing 24 by the coupled cable connectors 25 and mating connectors 27. Thus, the streamer cable 18B may be assembled from a plurality of connector-terminated segments each coupled to a corresponding mating connector on a sensor module housing 24 or other connector. Alternatively, the streamer cable 18B may include armor wires 18D extending substantially continuously from end to end, and the sensor modules 20 may be affixed to the exterior of the armor wires 18D.

An electromagnetic sensor, which may be a first electrode 28, is disposed on the outer surface of the housing 24, and may be made, for example, from lead, gold, graphite or other corrosion resistant, electrically conductive, low electrode potential material. In some cases, the electrode is made of a metal to metal-salt material (e.g., Ag—AgCl) to achieve good galvanic contact with more linear properties. Electrical connection between the first electrode 28 and measuring circuits 34 (explained in more detail with reference to FIG. 3) disposed inside the chamber 26 in the housing 24 may be made through a pressure sealed, electrical feed through bulkhead 30 disposed through the wall of the housing 24 and exposed at one end to the interior of the chamber 26. One such feed through bulkhead is sold under model designation BMS by Kemlon Products, 1424 N. Main Street, Pearland, Tex. 77581.

The measuring circuits 34 may be powered by a battery 36 disposed inside the chamber 26 in the housing 24. Battery power may be beneficial to supplying power from the recording system (12 in FIG. 1) over insulated electrical conductors in the streamer cable 18B so as to reduce the possibility of any electromagnetic fields resulting from current flowing along the cable 18B from interfering with the electromagnetic survey measurements made in the various sensor modules 20. There may be a multipolar electronic or combined microelectronic mechanical system (MEMS) switch 39 disposed between output of the electrodes and a signal input to the processing circuits 34. In other cases, however, power is supplied from the tow vessel. The switch 39 will be further explained with reference to FIG. 3.

The streamer cable 18B may include one or more optical fibers 38 for conducting command signals, such as from the recording system (12 in FIG. 1) to the circuits 34 in the various sensor modules 20, and for conducting signal telemetry from the modules 20 to the recording system (12 in FIG. 1) or to a separate data storage device (not shown). An insulated electrical conductor 32 forming part of the cable (18B in FIG. 2) may pass through the chamber 26 in the housing 24 such that electrical continuity in such conductor 32 is maintained along substantially the entire length of the cable 18.

Optical telemetry may be preferable to electrical telemetry for the same reason as using batteries for powering the circuits 34, namely, to reduce the incidence of electromagnetic fields caused by electrical current moving along the cable 18B. The insulated electrical conductor 32 in the present example serves as a common potential reference line between all of the sensor modules 20.

The insulated conductor 32 may be electrically in contact with the water (11 in FIG. 1) at the aft end of the streamer cable 18B by using an electrode (32A in FIG. 1) at the aft end of the streamer cable 18B. If the distance between the aft end of the streamer cable 18B and the transmitter (16A, 16B in FIG. 1) is sufficiently large, the voltage at the electrode (32A in FIG. 1) and thus along the entire electrical conductor 32 is substantially zero notwithstanding the electromagnetic field induced by the transmitter. The same cable configuration as explained herein with reference to FIG. 2 and further explained with reference to FIG. 3 may be used for all three streamer cables (18A, 18B, 18C in FIG. 1), and in each case the conductor 32 will represent a substantially zero voltage reference line along the entire length of each streamer cable.

Figure 3:
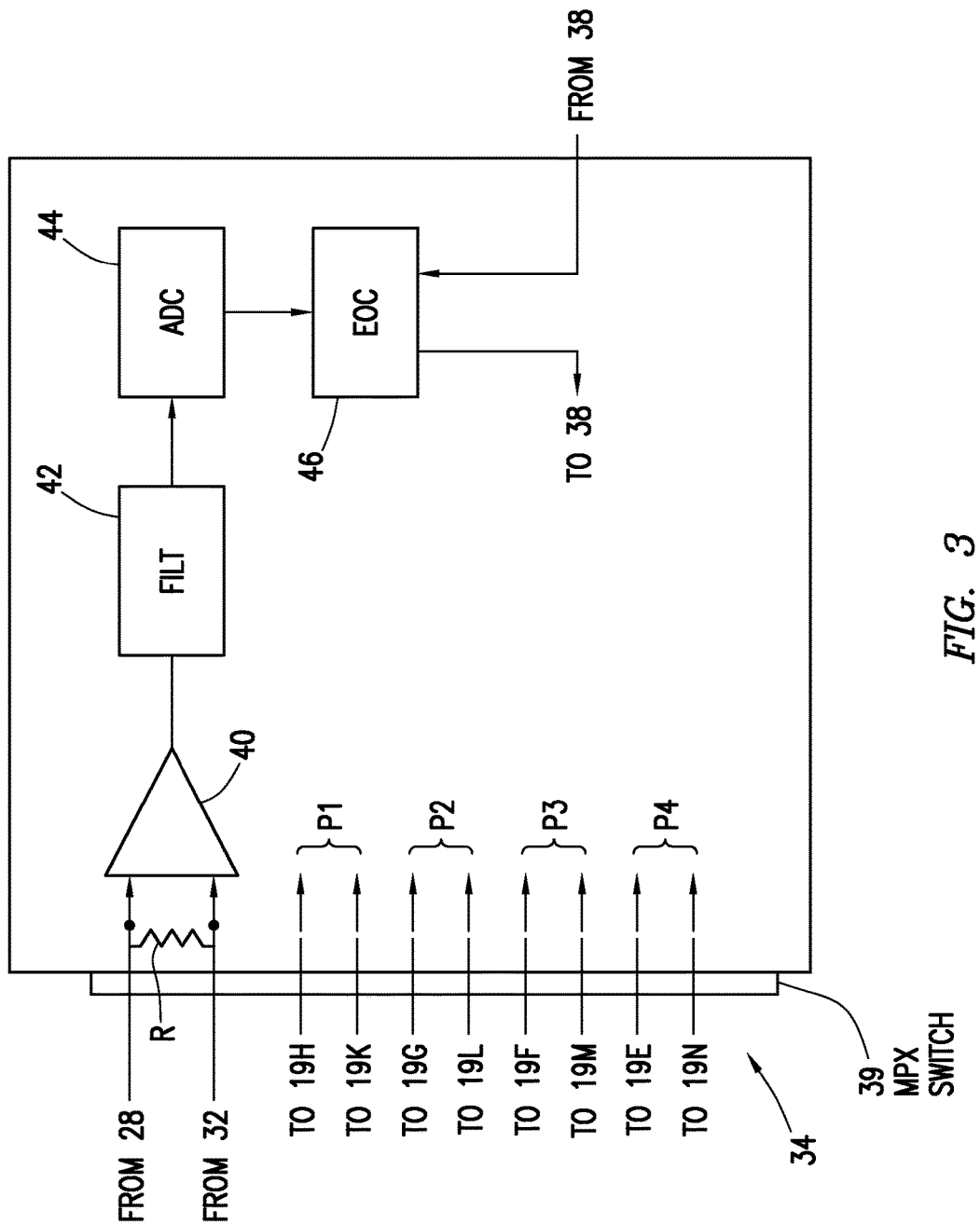
FIG. 3 shows more detail of example measurement and communication circuitry of the sensor module shown in FIG. 2.

One example of the signal processing circuits 34 is shown in more detail in FIG. 3. The circuits 34 may include a resistor R electrically coupled between the measuring electrode (28 in FIG. 2) and the insulated conductor 32, which as explained above serves as a common reference. The resistor R is also electrically connected across the input terminals of a preamplifier 40. Thus, voltage drop across the resistor R resulting from voltage difference between a fixed potential reference (conductor 32) and the measuring electrode (28 in FIG. 2) will be input to the preamplifier 40. Such voltage drop will be related to magnitude of the electric field gradient existing where the measuring electrode (28 in FIG. 2) is located at any point in time.

Output of the preamplifier 40 may be passed through an analog filter 42 before being digitized in an analog to digital converter (ADC) 44. Alternatively, the preamplifier 40 output may be directly digitized and the output of the ADC 44 can be digitally filtered. Output of the ADC 44, whether digitally filtered or not, may be conducted to an electrical to optical signal converter (EOC) 46. Output of the EOC 46 may be applied to the one or more optical fibers (38 in FIG. 2) in the cable (18B in FIG. 2) such that optical signals representative of the voltage measured by each measuring electrode (28 in FIG. 2) with respect to the reference conductor (32 in FIG. 2) may be communicated to the recording system (12 in FIG. 1) or to a data storage unit. The type of optical or other signal telemetry used in any implementation is a matter of discretion for the system designer and is not intended to limit the scope of the invention.

The example circuits in FIG. 3 may, as earlier explained, enable selective connection of various pairs of the electrodes (19A-19P) across the inputs of the preamplifier by using a multiplexer or mechanically implemented multipole switch 39. The switch 39 may also be implemented as a MEMS device as explained above. The selective switching of various electrode pairs shown in FIG. 3 provides as a first selection possibility the measurement of voltage between the electrode on the housing 28 and the reference electrode 32. In a second example selection, electrodes 19H and 19K (in FIG. 1) are coupled across the inputs of the preamplifier 40. The foregoing two electrodes are longitudinally relatively close to the module (20J) and so provide relatively short spacing between the electrodes. In the event longer electrode spacing becomes advisable, for example as a result of long offset between the transmitter (16A, 16B in FIG. 1) and the particular electrode pair, more widely spaced apart electrodes may be coupled across the preamplifier 40 input. For example, the switch 39 in its last position may couple electrodes 19E and 19N across the input of the preamplifier 40, thus providing a relatively large configuration.

Although the foregoing example (FIG. 1) shows one electrode between successive modules 20 connecting adjacent streamer segments, it will be appreciated by those skilled in the art that a single cable segment could be made with the module 20 centrally located and a plurality of electrodes disposed at successively larger distances from the module 20 in each segment. Thus each segment could be individually optimized for the intended use; or could be switched to make two or three dimensional measurements including in the two cross line directions as shown in FIG. 1. It is also possible to select for interconnection across the input terminals of any of the sensor module preamplifiers any two of the electrodes 19A-19P and/or 28, 32, with suitable lead through wires made available for the electrodes.

Embodiments of a streamer cable and sensor module therein according to the various aspects may enable reconfiguration of one or more electromagnetic sensor streamers to have increased offset and/or increased sensor spacing.

FIG. 4 shows a perspective cut-away view of a portion of a streamer cable in accordance with still further implementations. In particular, FIG. 4 shows a portion of a streamer cable 400 comprising an elongated outer jacket 402 that defines an exterior surface 404, an interior volume 406, a proximal end 408 (i.e., end closer to the vessel), a distal end 410, and a central axis 411. The outer jacket 402 may be constructed of a flexible and water tight material, such as any of a number of flexible plastic and/or rubber materials. In other cases, the exposed outer surface could be the outer surface of a "solid" material within which the interior components are disposed (e.g., an extruded rubber or plastic streamer where the interior components are placed during the extrusion). Thus, the outer jacket 402 is an optional component. Disposed within the interior volume 406 may be one or more ropes termed strength members 412 which may carry some or all the axial tension associated with towing the streamer cable 400 through water. Also disposed within the interior volume 406 are one more conductors (e.g., electrical, optical). For example, one more optical fibers 414 may be used to communicate with the sensor modules (not shown in FIG. 4) located along the streamer cable 400, and in some cases to optically power the sensor module components. Moreover, one or more electrical conductors 416 may be used to electrically coupled electrodes to the sensor modules. Portions of the interior volume 406 may filled with a buoyancy control material, such as kerosene or closed-cell foam.

FIG. 4 further shows several electrodes associated with the example streamer cable. In particular, FIG. 4 shows electrode 420 disposed on the exterior surface 404 of the streamer cable 400. The electrode 420 may electrically couple to a sensor module by way of an electrical conductor that feeds through a bulkhead through the outer jacket 402 (the bulkhead of the same type as previously described, though here through the outer jacket). While the sensor module of the previous example systems (e.g., FIG. 2) are exposed on the exterior surface of the streamer, in the example systems of FIG. 4 the sensor modules may reside within the internal volume defined by the outer jacket 402. Similarly, FIG. 4 shows an electrode 422 disposed on the exterior surface 404 of the outer jacket 402, the electrode 422 is disposed at a different axial location along streamer cable than the electrode 420, and more particularly the electrode 422 is disposed distal to the electrode 420. While the electrode 420 and the electrode 422 are shown aligned along the "top" of the streamer cable, any radial position of the electrodes relative to the central axis 411 is contemplated, and the radial positions need not be the same for the electrodes along a streamer cable.

Still referring to FIG. 4, FIG. 4 further shows an aperture 424 through the outer jacket 402. Though not visible in FIG. 4 (and discussed more with respect to FIG. 5), an electrode within the interior volume 406 may be in operational relationship with the aperture 424 such that when the streamer cable is submerged the electrode may be in electrical contact with water. In the balance of the specification, and in the claims, reference to an electrode "exposed on the exterior surface" shall mean any configuration where the electrode contacts the surrounding water when streamer cable is submerged, regardless of whether the electrode is physically resides on the outer surface (e.g., electrodes 420 and 422) or the electrodes are exposed to the water through an aperture in the outer jacket.

FIG. 5 shows a cross-sectional elevation view of the streamer cable 400 to explain further concepts. In particular, FIG. 5 shows elongated outer jacket 402 that defines an exterior surface 404 and an interior volume 406. Further visible are electrodes 420 and 422 on the exterior surface 404. FIG. 5 further shows electrode 500 in operational relationship with aperture 424 through the outer jacket 402. Thus, when the streamer cable 400 is submerged, the water surrounding the streamer cable 400 contacts not only the example electrodes 420 and 422, but also electrode 500. It follows that all the example electrodes shown are exposed on the exterior surface of the outer jacket 402.

Visible within the interior volume 406 are three example sensor modules 502, 504, and 506. In practice, each streamer cable 400 may be over 10,000 meters in length, and thus many more than three sensor modules may be disposed periodically along the streamer cable. In the example system of FIG. 5, each sensor module couples to two electrodes (i.e., couples to an electrode pair). Further in the example of FIG. 5, an electrode may be shared between adjacent sensor modules. For example, electrodes 420 and 500 are electrically coupled to sensor module 502 (i.e., electrodes 420 and 500 are the electrode pair for sensor module 502), while electrodes 500 and 422 are electrically coupled to sensor module 504 (i.e., electrodes 500 and 422 are the electrode pair for sensor module 504). FIG. 5 further shows a last electrode 508 of the example streamer cable, and electrodes 422 and 508 are electrically coupled to sensor module 506 (i.e., electrodes 422 and 508 are the electrode pair for sensor module 506). While electrode 508 is shown disposed on the distal end of the streamer cable, any placement on or near the distal end is contemplated.

The distance D between electrodes may vary depending on a variety of factors, such as depth of the underlying hydrocarbon bearing formation or frequency of the applied energy across the electrodes 16A and 16B (FIG. 1). An example distance D between each electrode of an electrode pair may range from 200 meters to 1.1 kilometers, inclusive. Thus, the axial distance along the streamer cable 400 spanned by the example electrodes and example sensor modules of FIG. 5 may span as much as 3.3 kilometers. While in the example system the distance D between the electrodes is the same, having evenly spaced electrodes is not required, and other non-uniform spacing is also contemplated.

Finally with respect to FIG. 5, FIG. 5 shows the example optical fiber 414 disposed within the interior volume 406. FIG. 5 does not show the strength members and/or any internal buoyancy fill material so as not to unduly complicate figure. The sensor modules 502, 504, and 506 may be as shown in FIG. 3, but in the example situation of FIG. 5 the switch 39 is not needed as each sensor module couples to only one electrode pair (i.e., the inputs to the amplifier 40 couple to respective electrodes of the coupled electrode pair).

Figure 6:
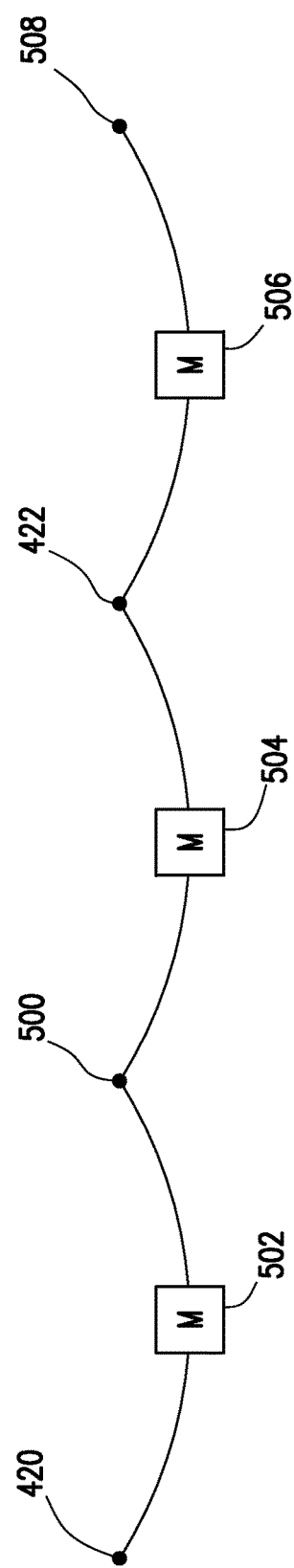
FIG. 6 shows, in a shorthand notation, the streamer cable of FIG. 5.

FIG. 6 shows a shorthand notation for the example layout of electrodes and sensor modules of FIG. 5. It is noted, however, that the shorthand notation is not limited to just implementations with an elongated outer jacket as in FIG. 4; rather, the shorthand notation is equally applicable to streamer cables constructed in accordance with FIG. 2. In particular, FIG. 6 shows electrodes 420, 500, 422, and 508. Electrodes 420 and 500 are electrically coupled to sensor module 502. Electrodes 500 and 422 are electrically coupled to sensor module 504. Electrodes 422 and 508 are electrically coupled to sensor module 506. Each sensor module measures a voltage between the electrode pair coupled to the sensor module. Thus, sensor module 502 measures a voltage across electrodes 420 and 500. Sensor module 504 measures a voltage across electrodes 500 and 422, and so on. Using the voltage measurements, the voltage across any two electrodes of the example electrodes may be determined by mathematical manipulation. For example, if the survey operator would like to know the voltage as between the distal-most electrode 508 and the proximal-most (in the picture) electrode 420, the voltages measured by each of the sensor modules 506, 504, and 502 may be mathematically added together to arrive at the desired voltage. Thus, systems and related methods operated with a streamer cable arranged as in FIG. 6 may provide similar outcomes to those implied in FIG. 3 without the need for the sensor modules to have a switch 39 and without the need for a conductor (such as conductor 32) to span the length of the streamer cable.

Figure 7:
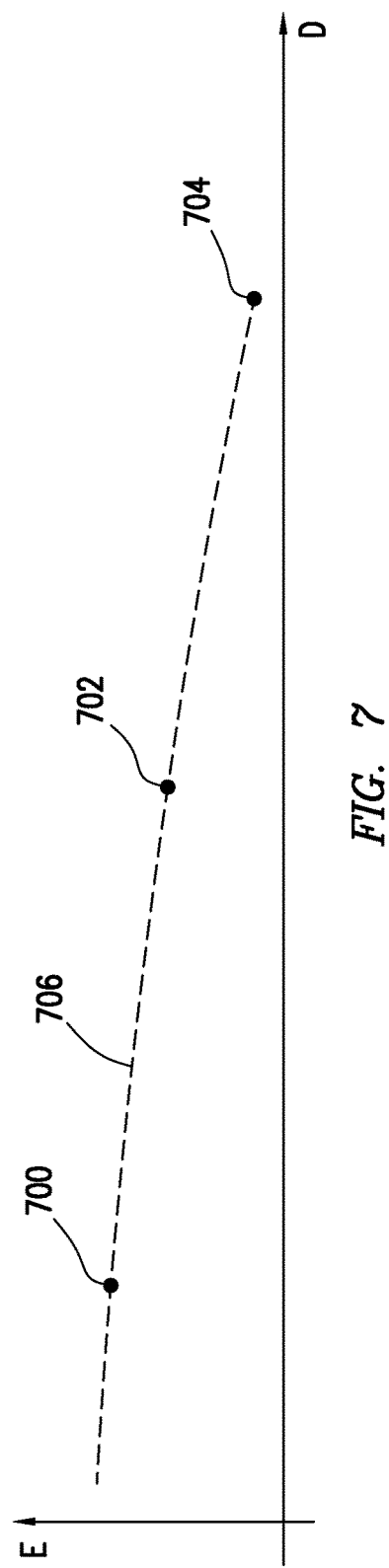
FIG. 7 shows a plot of electrical field versus distance along a streamer cable.

In accordance with example systems, however, the geologist or geophysicist may not be concerned directly with absolute voltage readings, as absolute voltage readings may not alone be indicative of the presence or absence of hydrocarbons in a formation underlying a body of water; rather, a geologist or geophysicist may be concerned with the change of measured voltage over the length of the streamer cable. More particularly still, a geologist or geophysicist may be most interested in the change of electric field along the streamer cable. Thus, at least some embodiments are directed to determining electric field along a streamer cable using the voltage measurements of each sensor module taking into account the spacing between electrodes. FIG. 7 shows a plot of electric field strength (the vertical axis) as a function of axial distance along the streamer cable (the horizontal axis). For purposes of explanation, the horizontal axis of FIG. 7 is shown to correspond to the axial distance spanned by the electrodes in FIG. 6.

Plot point 700 represents an electric field strength determined by a voltage measurement performed by sensor module 502 between the electrode pair comprising electrodes 420 and 500. More particularly still, the plot point 700 may be calculated by dividing the voltage measurement performed by sensor module 502 by the distance between the electrodes 420 and 500, resulting in an electric field strength with units of volts per meter. Similarly, plot point 702 represents an electric field strength calculated based on the voltage measurement performed by sensor module 504 between the electrode pair comprising electrodes 500 and 422. Finally, plot point 704 represents an electric field strength calculated based on the voltage measurement performed by sensor module 506 between the electrode pair comprising electrodes 422 and 508.

The electric fields calculated using the example method can be said to represent the electric field at the mid-point between the electrodes of the electrode pair upon which the calculation is made. Thus, plot point 700 resides in the middle between electrodes 420 and 500, plot point 702 resides in the middle between electrodes 500 and 422, and plot point 704 resides in the middle between electrodes 422 and 508. Dashed line 706 in FIG. 7 represents a conceptual "connecting" of the plot points representing electric field strengths at particular locations along the streamer cable. It is by analyzing plot points and dashed line 706, possibly in combination with other data (e.g., seismic survey data), that a geologist or geophysicist makes determinations as the presence or absence of hydrocarbons in a formation underlying a body of water.

The streamer cable shown in shorthand notation in FIG. 6, and the related method of determining the electric field along the streamer cable, may provide useful information, but the spatial density of the electric field determinations may be fairly low, particularly at the longer distances between the electrodes (e.g., 1.1 kilometers). When the formation being evaluated is small, or buried very deep beneath the water bottom, higher spatial density of the electric field strengths may provide better information.

FIG. 8 shows, in the shorthand notation introduced with respect to FIG. 6, a streamer cable in accordance with yet still further example embodiments. In particular, FIG. 8 shows electrodes 800, 802, 804, 806, 808, 810, 812, and 814 at axially spaced locations along the streamer cable, and all of which would be exposed on the exterior surface of the streamer cable. In some cases the distance between the location of each electrode (e.g., D2 or D4 in the figure) is the about the same, and in example cases the distance between each electrode may be between 200 and 500 meters, inclusive. Other spacing between the electrodes is possible and contemplated, including varying distances.

FIG. 8 further shows three example sensor modules 816, 818, and 820. In the example system, electrodes 800, 802, 804 and 806 electrically couple to the sensor module 816. Electrodes 800 and 802 would also couple to a proximal sensor module (not shown). Electrodes 804, 806, 808, and 810 electrically couple to the sensor module 818. Electrodes

808, 810, 812, and 814 electrically couple to the sensor module 820. Thus, in the example system of FIG. 8, each electrode couples to at least two sensor modules (with the exception of the proximal-most electrodes of a streamer cable (not shown) and the distal-most electrodes of the streamer cable (e.g., electrodes 812 and 814)), and thus many electrodes are shared amongst the sensor modules.

The electrodes can be considered to form electrode pairs defining distances between the electrodes of the pair. For example, electrodes 800 and 806 (associated with sensor module 816) form an electrode pair defining a distance D1 between them. In example systems, the distance D1 may span between 500 and 1.1 kilometers, inclusive. Electrodes 802 and 804 (also associated with sensor module 816) form an electrode pair defining a distance D2 between them, where the distance D2 overlaps and resides within the distance D1. In example systems, the distance D2 may span between 200 and 500 meters, inclusive. Electrodes 800 and 804 (associated with sensor module 816) form an electrode pair that shares an electrode (i.e., electrode 800) with another electrode pair associated with sensor module 816. The distance D5 between electrodes 800 and 804 overlaps and resides within the distance D1 and also partially overlaps the distance D2. In example systems, the distance D5 may span between 300 and 700 meters, inclusive. Similarly, electrodes 802 and 806 (still associated with sensor module 816) form an electrode pair that shares an electrode (i.e., electrode 806) with another electrode pair associated with sensor module 816. The distance D6 between electrodes 802 and 806 overlaps and resides within the distance D1and also partially overlaps the distance D2. In example systems, the distance D6 may span between 300 and 700 meters, inclusive. It will be recognized that similar electrode pairs, spanning similar distances and having similar overlaps, will be associated with each sensor module in systems illustrated by FIG. 8 (again with the exception of the proximal-most (not shown) and distal-most sensor modules (e.g., sensor module 820)). Thus, distance D3 may be about the same as distance D1, and distance D4 may be about the same as distance D2, and so on.

In the example system shown by FIG. 8, electrodes pairs associated with a sensor module 816 define distances that also overlap distances defined between electrodes pairs associated with sensor module 818. For example, the electrode pair made of electrodes 800 and 806 (sensor module 816) overlaps the sensor module 818 electrode pair made of electrodes 804 and 810 as well as sensor module 818 electrode pair made of electrodes 804 and 808. Similarly, the electrodes pair made of electrodes 802 and 806 (sensor module 816) overlaps the sensor module 818 electrode pair made of electrodes 804 and 810 as well as sensor module 818 electrode pair made of electrodes 804 and 808. By the same token, the electrode pair made of electrodes 804 and 810 (sensor module 818) overlap the sensor module 820 electrode pair made of electrodes 808 and 814 as well as sensor module 820 electrode pair made of electrodes 808 and 812. Similarly, the electrode pair made of electrodes 806 and 810 (sensor module 818) overlap the sensor module 820 electrode pair made of electrodes 808 and 814 as well as sensor module 820 electrode pair made of electrodes 808 and 812.

In the arrangement of electrodes shown in FIG. 8, additional voltage readings, and therefore additional electric field strength determinations, may be made. Using the voltage measurements, the voltage across any two electrodes of the example electrodes may be determined by mathematical manipulation. For example, if the survey operator would like to know the voltage as between the distal-most electrode 814 and the proximal-most (in the picture) electrode 800, the voltages measured by each of sensor modules 816, 818, and 820 may be mathematically added together to arrive at the desired voltage. For example, to arrive at a voltage measurement across electrodes 800 and 814, the voltage across electrodes 800 and 806 may be added to the voltage across electrodes 806 and 808 and added to the voltage across electrodes 808 and 814. Other combinations of voltage readings could be mathematically combined to arrive at the desired voltage. The systems and related methods operated with a streamer cable arranged as in FIG. 8 may provide similar outcomes to those implied in FIG. 3 without the need for a conductor (such as conductor 32) to span the length of the streamer cable.

The example arrangement of FIG. 8 also provides a mechanism to check and/or verify voltage measurements. For example, if the voltage measurement across electrodes 800 and 806 is suspect, the voltage may be checked by adding the voltage across electrodes 800 and 804 to the voltage across electrodes 802 and 806 and subtracting the voltage across electrodes 802 and 804. Thus, for example, if an electrode has been electrically disconnected from a sensor module, by mathematically combining other voltage readings the issue may be identified.

FIG. 9 shows a plot of electric field strength (the vertical axis) as a function of axial distance along the streamer cable (the horizontal axis) for the example electrode configuration of FIG. 8. For purposes of explanation, the distance represented by horizontal axis of the FIG. 9 is shown to correspond to the axial distance spanned by the electrodes in FIG. 8.

Plot point 900 represents an electric field strength determined by a voltage measurement performed by sensor module 816 between the electrode pair made of electrodes 800 and 806. More particularly still, the plot point 900 may be calculated by dividing the voltage measurement performed by sensor module 816 by the distance between the electrodes 800 and 806, resulting in an electric field strength with units of volts per meter. Similarly, plot point 902 represents an electric field strength calculated based on the voltage measurement performed by sensor module 818 between the electrode pair made of electrodes 804 and 810. Finally, plot point 904 represents an electric field strength calculated based on the voltage measurement performed by sensor module 820 between the electrode pair made of electrodes 808 and 814.

As before, the electric fields calculated using the example method can be said to represent the electric field at the mid-point between the electrodes of the electrode pair upon which the calculation is made. Thus, plot point 900 resides in the middle between electrodes 800 and 806, plot point 902 resides in the middle between electrodes 804 and 810, and plot point 904 resides in the middle between electrodes 808 and 814. Dashed line 906 in FIG. 9 represents a conceptual "connecting" of the plot points representing electric field strengths at particular locations along the streamer cable.

The arrangement of electrodes as illustrated by FIG. 8 enables additional electric field strength determinations, and thus a higher spatial density of measurements. Plot point 908 represents electric field strength determined based on a voltage measurement performed by sensor module 816 between the electrode pair made of electrodes 800 and 804. Similarly, plot point 910 represents an electric field strength calculated based on the voltage measurement performed by sensor module 816 between the electrode pair made of electrodes 802 and 806. Plot point 912 represents electric field strength determined based on a voltage measurement performed by sensor module 818 between the electrode pair made of electrodes 804 and 808. Plot point 914 represents an electric field strength calculated based on the voltage measurement performed by sensor module 818 between the electrode pair made of electrodes 806 and 810. Plot point 916 represents electric field strength determined based on a voltage measurement performed by sensor module 820 between the electrode pair made of electrodes 808 and 812. Finally, plot point 918 represents an electric field strength calculated based on the voltage measurement performed by sensor module 820 between the electrode pair made of electrodes 810 and 814.

By analyzing plot points and line 906, possibly in combination with other data (e.g., seismic survey data), a geologist or geophysicist may make determinations as the presence or absence of hydrocarbons in a formation underlying a body of water.

In the various embodiments discussed to this point multiple electric field strength determinations may be made, in some cases electric field strength determinations across overlapping distances, and based on shared electrodes between sensor modules. For any of a variety of reasons (e.g., reduction of induced noise), it may be desirable to reduce the length of electrical conductors coupled to each electrode and/or to electrically separate electrodes associated with distinct sensor modules.

Figure 10:
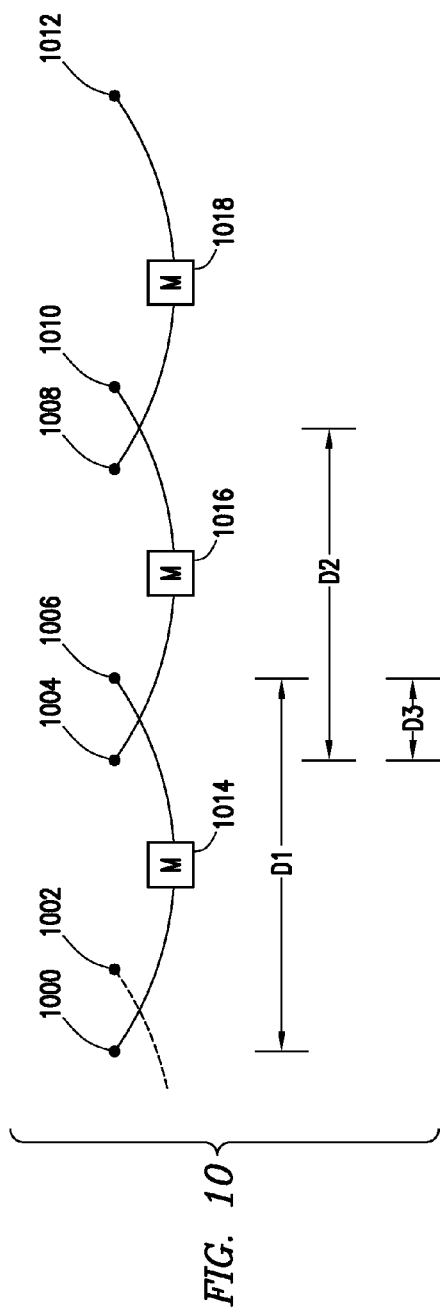
FIG. 10 shows, in the shorthand notation, a streamer cable in accordance with further example embodiments.

FIG. 10 shows, in the shorthand notation previously introduced, a streamer cable in accordance with yet still further example embodiments. In particular, FIG. 10 shows electrodes 1000, 1002, 1004, 1006, 1008, 1010, and 1012 at axially spaced locations along the streamer cable, and with electrode 1012 being the most distal electrode. All the electrodes are exposed on the exterior surface of the streamer cable. FIG. 10 further shows three example sensor modules 1014, 1016, and 1018. In the example system, electrodes 1000 and 1006 electrically couple to the sensor module 1014. Electrode 1002 electrically couples to a proximally-located sensor module (not specifically shown). Electrodes 1004 and 1010 electrically couple to the sensor module 1016. Electrodes 1008 and 1012 electrically couple to the sensor module 1018. Thus, in the example system of FIG. 10, electrodes are not shared among the sensor modules. FIG. 10 also shows various distances, such as D1, D2, etc.; however, while the distance nomenclature is the same as FIG. 8, the distances are not necessarily the same. Each figure stands alone in this regard.

The electrodes can be considered to form electrode pairs defining distances between the electrodes of the pair. For example, electrodes 1000 and 1006 (associated with sensor module 1014) form an electrode pair defining a distance D1 between them. In example systems, the distance D1 may span between 500 meters and 1.1 kilometers, inclusive. Electrodes 1004 and 1010 (associated with sensor module 1016) form an electrode pair defining a distance D2 between them, where the distance D2 partially overlaps the distance D1 by an amount D3. In example systems, the distance D2 span between 500 meters and 1.1 kilometers, inclusive, and the distance D3 may span between 200 and 500 meters, inclusive. Electrodes 1008 and 1012 (associated with sensor module 1018) form an electrode pair that defines a distance (not specifically marked in the figure, but about the same as D1) that partially overlaps the distance D2 (the overlap about the same as D3).

In the arrangement of electrodes shown in FIG. 10, voltage readings, and therefore electric field strength determinations, may be made. Unlike previous embodiments, it may not be possible to directly measure or calculate a voltage across any two electrode pairs (other than the pairs directly coupled to the same sensor module). However, keeping in mind that geologists and/or geophysicists are primarily concerned with the change in electric field along the streamer cable, similar and satisfactory results can be obtained using a streamer cable as illustrated by FIG. 10. As before, an electric field along the streamer cable may be determined by measuring voltage across each electrode pair, and calculating electric field strength based on the voltage and distance between electrodes. Again as before, the electric fields calculated using the example method can be said to represent the electric field at the mid-point between the electrodes of the electrode pair upon which the calculation is made. The arrangement of electrodes as illustrated by FIG. 10 enables electric field strength determinations with higher spatial density of measurements (as compared to, for example, the embodiments of FIG. 6) without sharing of electrodes between sensor modules.

The streamer cable shown in shorthand notation in FIG. 10, and the related method of determining the electric field along the streamer cable, may provide useful information, but the spatial density of the electric field determinations may be fairly low at the longer distances between the electrodes of the electrode pairs (e.g., 1.1 kilometers) and small overlaps. When the formation being evaluated is small, or buried very deep beneath the water bottom, higher spatial density of the electric field strengths may provide better information.

Figure 11:
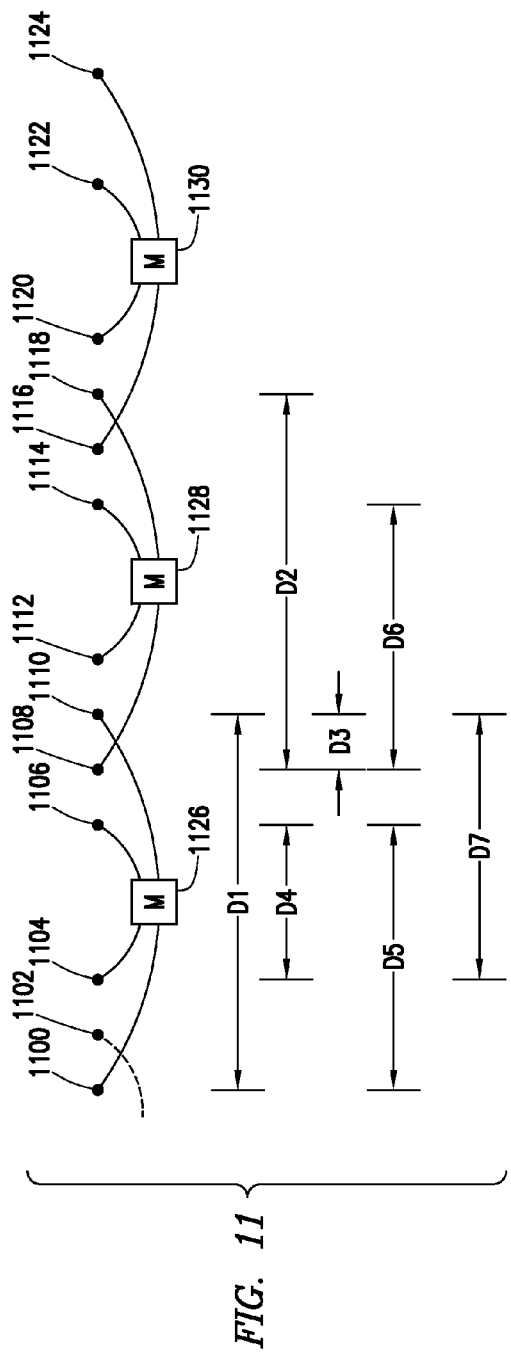
FIG. 11 shows, in the shorthand notation, a streamer cable in accordance with further example embodiments.

FIG. 11 shows, in the shorthand notation previously introduced, a streamer cable in accordance with yet still further example embodiments. In particular, FIG. 11 shows electrodes 1100, 1102, 1104, 1106, 1108, 1110, 1112, 1114, 1116, 1118, 1120, 1122, and 1124 at axially spaced locations along the streamer cable, all the electrodes would be exposed on the exterior surface of the streamer cable, and with electrode 1124 being the most distal electrode. FIG. 11 further shows three example sensor modules 1126, 1128, and 1130. In the example system, electrodes 1100, 1104, 1106 and 1110 electrically couple to the sensor module 1126. Electrode 1102 electrically couples to a proximally-located sensor module (not specifically shown). Electrodes 1108, 1112, 1114, and 1118 electrically couple to the sensor module 1128. Electrodes 1116, 1120, 1122, and 1124 electrically couple to the sensor module 1130. Thus, in the example system of FIG. 11, electrodes are not shared among the sensor modules. FIG. 11 also shows various distances, such as D1, D2, etc.; however, while the distance nomenclature is the same as FIGS. 8 and 10, the distances are not necessarily the same. Each figure stands alone in this regard.

The electrodes can be considered to form electrode pairs defining distances between the electrodes of the pair. For example, electrodes 1100 and 1110 (associated with sensor module 1026) form an electrode pair defining a distance D1 between them. In example systems, the distance D1 may span between 500 and 1.1 kilometers, inclusive. Electrodes 1108 and 1118 (associated with sensor module 1128) form an electrode pair defining a distance D2 between them, where the distance D2 partially overlaps the distance D1 by an amount D3. In example systems, the distance D3 may span between 200 and 500 meters, inclusive. Electrodes 1116 and 1124 (associated with sensor module 1130) form an electrode pair that defines a distance (not specifically marked, but about the same as D1) that partially overlaps the distance D2 (the overlap about the same as D3).

FIG. 11 further shows electrodes 1104 and 1106 (associated with sensor module 1126) form an electrode pair with a distance D4 between them. The distance D4 overlaps and resides fully within the distance D1. In the example systems, D3 may span between 200 and 500 meters, inclusive. Electrodes 1112 and 1114 (associated with sensor module 1128) form an electrode pair with a distance between them (not specifically delineated, but about the same as D4). The distance between electrodes 1112 and 1114 overlaps and resides fully within the distance D2. Finally, electrodes 1120 and 1122 (associated with sensor module 1130) form an electrode pair with a distance between them (not specifically delineated, but again about the same as D4). The distance between electrodes 1120 and 1122 overlaps and resides fully within the distance between electrodes 1116 and 1124.

Additional electrode pair combinations are also present for each sensor module and the recited electrodes. For example, electrodes 1100 and 1106 (associated with sensor module 1126) form an electrode pair defining a distance D5 between them. In example systems, the distance D5 may span between 300 and 700 meters, inclusive. The distance D5 may reside fully within the distance D1, and the distance D5 may overlap D4. Electrodes 1108 and 1114 (associated with sensor module 1128) form an electrode pair defining a distance D6 between them of similar distance to D5. The distance D6 resides fully within distance D2, overlaps D3, and overlaps a distance defined between electrodes 1112 and 1114. Electrodes 1116 and 1122 (associated with sensor module 1130) may form a similarly spaced electrode pair defining a similar distance (e.g., about the same distance as D5 and D6), and having similar overlapping portions. Likewise for other electrodes coupled to the sensor module 1126, electrodes 1104 and 1110 form an electrode pair defining a distance D7 between them. In example systems, the distance D7 may span between 300 and 700 meters, inclusive. The distance D7 may reside fully within the distance D1, the distance D7 may fully overlap D4, the distance D7 may partially overlap distances D2 and D6. Electrodes 1112 and 1118 (associated with sensor module 1128) may form a similarly spaced electrode pair defining a distance (not specifically marked) that resides fully within distance D2 and overlaps D6. Electrodes 1120 and 1124 (associated with sensor module 1130) may form a similarly spaced electrode pair defining a similar distance and similar overlapping patterns (with electrodes associated with sensor module 1128).

In the arrangement of electrodes shown in FIG. 11, voltage readings, and therefore electric field strength determinations, may be made. Unlike the embodiments discussed with respect to FIGS. 6 and 8, it may not be possible to directly measure or calculate a voltage across any two electrode pairs (other than the pairs directly coupled to the same sensor module). However, again keeping in mind that geologists and/or geophysicists are primarily concerned with the change in electric field along the streamer cable, similar and satisfactory results can still be obtained using a streamer cable as illustrated by FIG. 11. As before, an electric field along the streamer cable may be determined by measuring voltage across each electrode pair, and calculating electric field strength therefrom and based on the distance between electrodes of the electrode pair. Again as before, the electric fields calculated using the example method can be said to represent the electric field at the mid-point between the electrodes of the electrode pair upon which the calculation is made. The arrangement of electrodes as illustrated by FIG. 11 enables electric field strength determinations with higher spatial density of measurements (as compared to, for example, the embodiments of FIG. 6) without sharing of electrodes between sensor modules.

The example arrangement of FIG. 11 also provides a mechanism to check and/or verify voltage measurements. For example, if the voltage measurement across electrodes 1100 and 1110 is suspect, the voltage may be checked by adding the voltage across electrodes 1100 and 1106 to the voltage across electrodes 1104 and 1110 and subtracting the voltage across electrodes 1104 and 1106. Thus, for example, if an electrode has been electrically disconnected from a sensor module, by mathematically combining other voltage readings the issue may be identified.

The streamer cable shown in shorthand notation in FIG. 11, and the related method of determining the electric field along the streamer cable, may provide information with higher spatial density of the electric field determinations. However, other configurations may provide even higher spatial density of electric field determinations.

Figure 12:
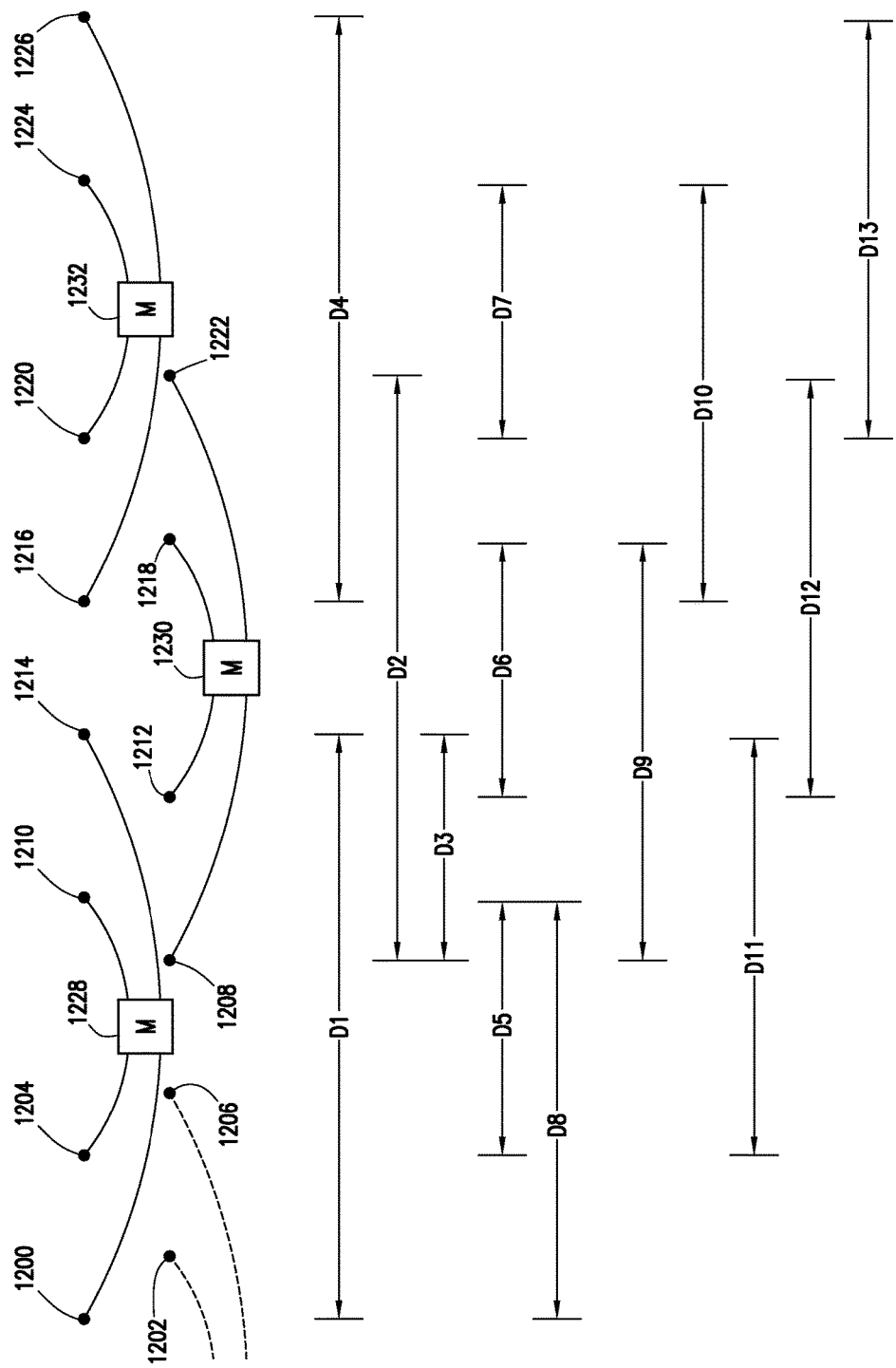
FIG. 12 shows, in the shorthand notation, a streamer cable in accordance with further example embodiments.

FIG. 12 shows, in the shorthand notation previously introduced, a streamer cable in accordance with yet still further example embodiments. In particular, FIG. 12 shows electrodes 1200, 1202, 1204, 1206, 1208, 1210, 1212, 1214, 1216, 1218, 1220, 1222, 1224, and 1226 at axially spaced locations along the streamer cable. All the electrodes would be exposed on the exterior surface of the streamer cable, with electrode 1226 being the most distal electrode. FIG. 12 further shows three example sensor modules 1228, 1230, and 1232. In the example system, electrodes 1200, 1204, 1210, and 1214 electrically couple to the sensor module 1228. Electrodes 1202 and 1206 electrically couple to a proximally-located sensor module (not specifically shown). Electrodes 1208, 1212, 1218, and 1222 electrically couple to the sensor module 1230. Electrodes 1216, 1220, 1224, and 1226 electrically couple to the sensor module 1232. Thus, in the example system of FIG. 12, electrodes are not shared among the sensor modules. FIG. 12 also shows various distances, such as D1, D2, etc.; however, while the distance nomenclature is the same as FIGS. 8, 10, and 11, the distances are not necessarily the same. Each figure stands alone in this regard.

The electrodes can be considered to form electrode pairs defining distances between the electrodes of the pair. For example, electrodes 1200 and 1214 (associated with sensor module 1228) form an electrode pair defining a distance D1 between them. In example systems, the distance D1 may span between 500 meters and 1.1 kilometers, inclusive. Electrodes 1208 and 1222 (associated with sensor module 1230) form an electrode pair defining a distance D2 between them, where the distance D2 partially overlaps the distance D1 by an amount D3. In example systems, the distance D3 may span between 200 and 500 meters, inclusive. Electrodes 1216 and 1226 (associated with sensor module 1232) form an electrode pair that defines a distance D4 being about the same as D1 and D2, and the distance D4 partially overlaps the distance D2 (the overlap about the same as D3).

FIG. 12 further shows electrodes 1204 and 1210 (associated with sensor module 1228) form an electrode pair with a distance D5 between them. The distance D5 overlaps and resides fully within the distance D1, and partially overlaps both the distance D2 and D3. In the example systems, D5 may span between 200 and 500 meters, inclusive. Electrodes 1212 and 1218 (associated with sensor module 1230) form an electrode pair with a distance D6 between them. The distance D6 overlaps and resides fully within the distance D2, partially overlaps both the D3 and D4, and is about the same distance as D5. Finally, electrodes 1220 and 1224 (associated with sensor module 1232) form an electrode pair with a distance D7 between them. The distance D7 overlaps and resides fully within the distance D4, partially overlaps distance D2, and is about the same distance as D5 and D6.

Additional electrode pair combinations are also present for each sensor module and the recited electrodes. For example, electrodes 1200 and 1210 (associated with sensor module 1228) form an electrode pair defining a distance D8 between them. In example systems, the distance D8 may span between 300 and 700 meters, inclusive. The distance D8 may reside fully within the distance D1, the distance D8 may partially overlap D2 and D3, and may fully overlap D5. Distance D8 may likewise overlap distances defined by electrodes 1202 and 1206 associated with a proximally-located sensor module (not shown). Electrodes 1208 and 1218 (associated with sensor module 1230) form an electrode pair defining a distance D9 between them of similar distance to D8. The distance D9 resides fully within distance D2, partially overlaps D1, D4, D5, and D8, and fully overlaps D3 and D6. Electrodes 1216 and 1224 (associated with sensor module 1232) form an electrode pair defining a distance D10 between them of similar distance to D9. The distance D10 resides fully within distance D4, partially overlaps D2, D6, and D9, and fully overlaps D7.

Still referring to FIG. 12, likewise for other electrodes coupled to the sensor module 1228, electrodes 1204 and 1214 form an electrode pair defining a distance D11 between them. In example systems, the distance D11 may span between 300 and 700 meters, inclusive. The distance D11 may reside fully within the distance D1, the distance D11 may fully overlap D5 and D3, and may partially overlap distances D2, D6, D8, and D9. Electrodes 1212 and 1222 (associated with sensor module 1230) may form an electrode pair defining a distance D12 that resides fully within distance D2, fully overlaps D6, and partially D1, D3, D4, D7, D8, D9, D10 and D11. Electrodes 1220 and 1226 (associated with sensor module 1232) may form an electrode pair defining a distance D13 that resides fully within distance D4, fully overlaps D7, and partially D2, D10, and D12.

In the arrangement of electrodes shown in FIG. 12, voltage readings, and therefore electric field strength determinations, may be made. Unlike the embodiments discussed with respect to FIGS. 6 and 8, it may not be possible to directly measure or calculate a voltage across any two electrode pairs (other than the pairs directly coupled to the same sensor module). However, again keeping in mind that geologists and/or geophysicists are primarily concerned with the change in electric field along the streamer cable, similar and satisfactory results can still be obtained using a streamer cable as illustrated by FIG. 12. As before, an electric field along the streamer cable may be determined by measuring voltage across each electrode pair, and calculating electric field strength therefrom and based on the distance between electrodes of the electrode pair. Again as before, the electric fields calculated using the example method can be said to represent the electric field at the mid-point between the electrodes of the electrode pair upon which the calculation is made. The arrangement of electrodes as illustrated by FIG. 12 enables electric field strength determinations with higher spatial density of measurements (as compared to, for example, any of the previous embodiments) without sharing of electrodes between sensor modules.

The example arrangement of FIG. 12 also provides a mechanism to check and/or verify voltage measurements. For example, if the voltage measurement across electrodes 1200 and 1214 is suspect, the voltage may be checked adding the voltage across electrodes 1200 and 1210 to the voltage across electrodes 1204 to 1214 and subtracting the voltage across electrodes 1204 and 1210. Thus, for example, if an electrode has been electrically disconnected from a sensor module, by mathematically combining other voltage readings the issue may be identified.

Figure 13:
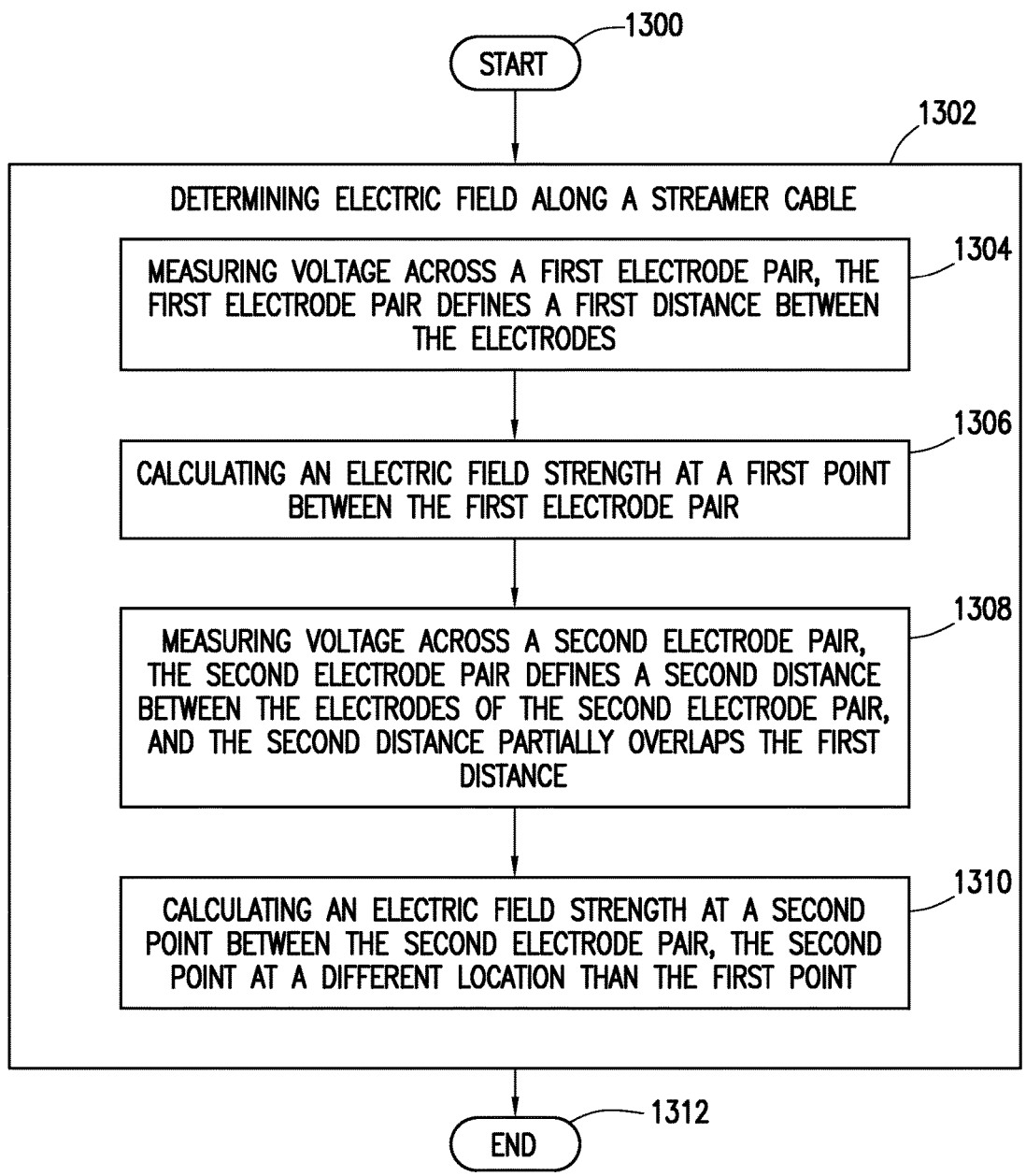
FIG. 13 shows a method in accordance with example embodiments.

FIG. 13 shows a method in accordance with at least some embodiments. In particular, the method starts (block 1300) and comprises determining electric field along a streamer cable (block 1302). The determination of the electric field may comprise: measuring voltage across a first electrode pair, the first electrode pair defines a first distance between the electrodes (block 1304); calculating an electric field strength at a first point between the first electrode pair (block 1306); measuring voltage across a second electrode pair, the second electrode pair defines a second distance between the electrodes of the second electrode pair, and the second distance partially overlaps the first distance (block 1308); and calculating an electric field strength at a second point between the second electrode pair, the second point at a different location than the first point (block 1310). Thereafter the method ends (block 1312), possibly to be immediately restarted for a new set of voltage measurements.

Figure 14:
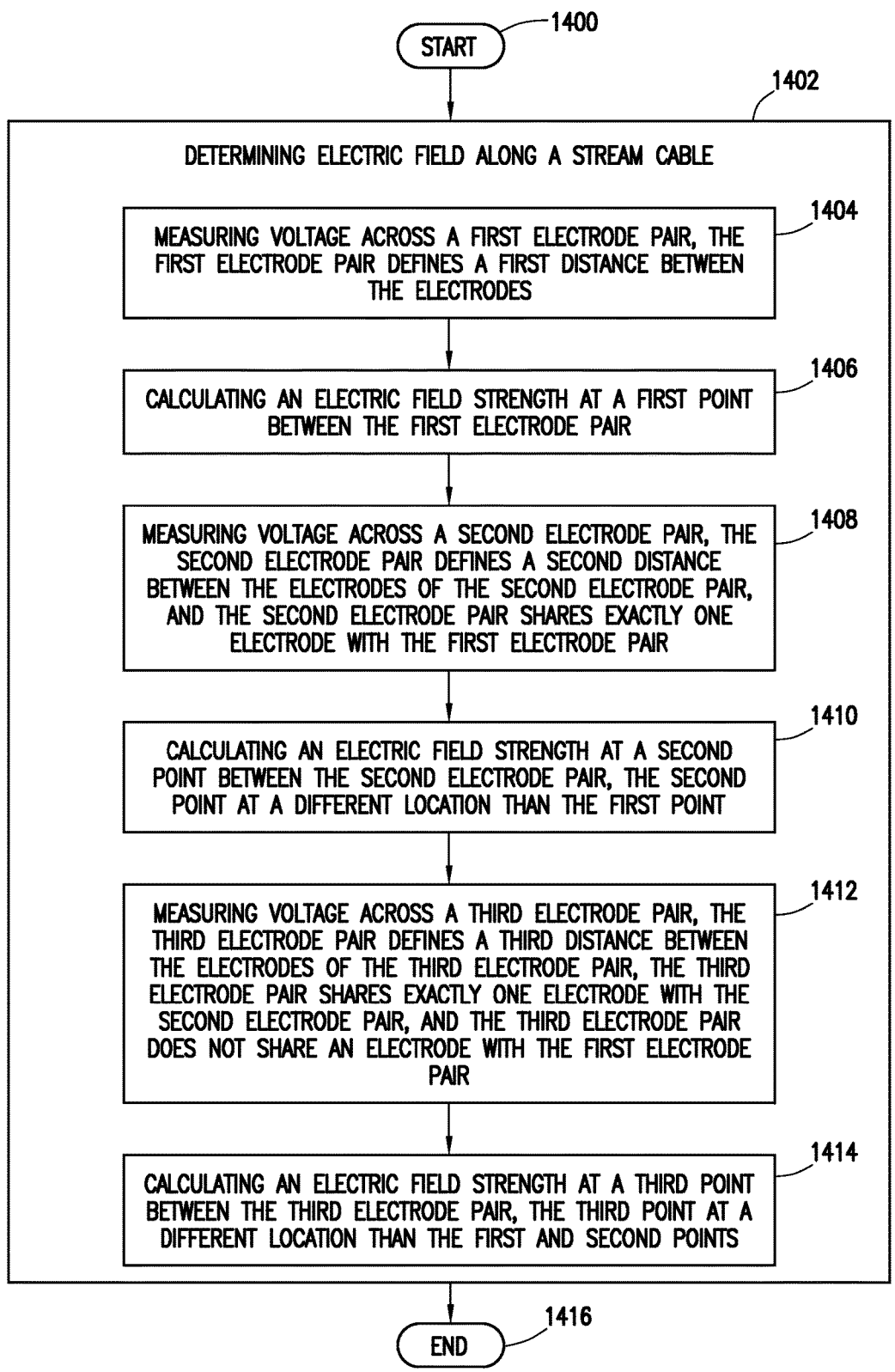
FIG. 14 shows a method in accordance with example embodiments.

FIG. 14 shows a method in accordance with yet still further example embodiments. In particular, the method starts (block 1400) and comprises determining electric field along a streamer cable (block 1402). The determining may comprise: measuring voltage across a first electrode pair, the first electrode pair defines a first distance between the electrodes (block 1404); calculating an electric field strength at a first point between the first electrode pair (block 1406); measuring voltage across a second electrode pair, the second electrode pair defines a second distance between the electrodes of the second electrode pair, and the second electrode pair shares exactly one electrode with the first electrode pair (block 1408); calculating an electric field strength at a second point between the second electrode pair, the second point at a different location than the first point (block 1410); measuring voltage across a third electrode pair, the third electrode pair defines a third distance between the electrodes of the third electrode pair, the third electrode pair shares exactly one electrode with the second electrode pair, and the third electrode pair does not share an electrode with the first electrode pair (block 1412); and calculating an electric field strength at a third point between the third electrode pair, the third point at a different location than the first and second points (block 1414). Thereafter the method ends (block 1416), possibly to be immediately restarted for a new set of voltage measurements.

In accordance with an embodiment of the invention, a geophysical data product may be produced. The geophysical data product may include information about the electric field along a streamer cable obtained by methods described above, for example, the methods illustrated in FIG. 13 or 14. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A streamer cable comprising:
an exterior surface, an interior volume, a proximal end, a distal end, and a length;
a first electrode exposed on the exterior surface of the streamer cable, the first electrode at a first location along the streamer cable;
a second electrode exposed on the exterior surface, the second electrode at a second location along the streamer cable, the second location distal to the first location;
a first sensor module electrically coupled directly to the first electrode and electrically coupled directly second electrode, the first sensor module configured to measure a voltage across the first and second electrodes;
a third electrode exposed on the exterior surface, the third electrode disposed at a third location between the first and second electrodes;
a fourth electrode exposed on the exterior surface, the fourth electrode at a fourth location along the streamer cable, the fourth location distal to the second location; and
a second sensor module electrically coupled directly to the third electrode and electrically coupled directly fourth electrode, the second sensor module configured to measure a voltage across the third and fourth electrodes.

2. The streamer cable of claim 1 further comprising:
a fifth electrode exposed on the exterior surface, the fifth electrode disposed at a fifth location between the second and fourth electrodes;
a sixth electrode exposed on the exterior surface, the sixth electrode at a sixth location along the streamer cable, the sixth location distal to the fourth location; and
a third sensor module electrically coupled to the fifth electrode and sixth electrodes, the third sensor module configured to measure a voltage across the fifth and sixth electrodes.

3. The streamer cable of claim 1 further comprising:
a fifth electrode exposed on the exterior surface, the fifth electrode disposed at a fifth location between the first and third electrodes;
a sixth electrode exposed on the exterior surface, the sixth electrode disposed at a sixth location between the fifth and third electrodes;
said first sensor module electrically coupled to the fifth and sixth electrodes, the first sensor module configured to measure a voltage across the first and sixth electrodes, and the first sensor module configured to measure a voltage across the fifth and second electrodes;
a seventh electrode exposed on the exterior surface, the seventh electrode disposed at a seventh location between the second and fourth electrodes;
an eighth electrode exposed on the exterior surface, the eighth electrode disposed at an eighth location between the seventh and fourth electrodes; and
said second sensor module electrically coupled to the seventh and eighth electrodes, the second sensor module configured to measure a voltage across the third and eighth electrodes, and the second sensor module configured to measure a voltage across the seventh and fourth electrodes.

4. The streamer cable of claim 1 further comprising:
a fifth electrode exposed on the exterior surface, the fifth electrode disposed at a fifth location between the first and third electrodes;
a sixth electrode exposed on the exterior surface, the sixth electrode disposed at a sixth location between the third and second electrodes;
said first sensor module electrically coupled to the fifth and sixth electrodes, the second sensor module configured to measure a voltage across the first and sixth electrodes, and the first sensor module configured to measure a voltage across the fifth and second electrodes;
a seventh electrode exposed on the exterior surface, the seventh electrode disposed at a seventh location between the sixth and second electrodes;
an eighth electrode exposed on the exterior surface, the eighth electrode disposed at an eighth location between the second and fourth electrodes; and
said second sensor module electrically coupled to the seventh and eighth electrodes, the second sensor module configured to measure a voltage across the third and eighth electrodes, and the second sensor module configured to measure a voltage across the seventh and fourth electrodes.

5. The streamer cable of claim 4 further comprising:
a ninth electrode exposed on the exterior surface, the ninth electrode disposed at a ninth location between the second and eighth electrodes;
a tenth electrode exposed on the exterior surface, the tenth electrode at a tenth location along the streamer cable, the tenth location distal to the fourth location;
a third sensor module electrically coupled to the ninth and tenth electrode, the third sensor module configured to measure a voltage across the ninth and tenth electrodes;
an eleventh electrode exposed on the exterior surface, the eleventh electrode disposed at an eleventh location between the eighth and fourth electrodes;
a twelfth electrode exposed on the exterior surface, the twelfth electrode at a twelfth location between the fourth and tenth electrodes;
said third sensor module electrically coupled to the eleventh and twelfth electrode, the third sensor module configured to measure a voltage across the ninth and twelfth electrodes, and the third sensor module configured to measure a voltage across the eleventh and tenth electrodes.

6. A method comprising:
determining electric field along a streamer cable, the determining by:
measuring voltage across a first electrode pair, the first electrode pair defines a first distance between the electrodes;
calculating an electric field strength at a first point between the first electrode pair;
measuring voltage across a second electrode pair, the second electrode pair defines a second distance between the electrodes of the second electrode pair, and the second distance partially overlaps the first distance, and the measuring voltage across the second electrode pair simultaneous with measuring voltage across the first electrode pair; and
calculating an electric field strength at a second point between the second electrode pair, the second point at a different location than the first point.

7. The method of claim 6 wherein determining the electric field further comprises:

measuring voltage across third electrode pair, the third electrode pair defines a third distance between the electrodes of the third electrode pair, and the third distance partially overlaps the second distance; and calculating an electric field strength at a third point between the third electrode pair, the third point at a different location than the first or second point.

8. The method of claim 6 wherein determining the electric field further comprises:

measuring voltage across a third electrode pair, the third electrode pair defines a third distance between the electrodes of the third electrode pair, the third distance shorter than and residing within the first distance, and the third electrode pair shares exactly one electrode with the first electrode pair;

calculating an electric field strength at a third point between the third electrode pair, the third point at a different location than the first or second point;

measuring voltage across a fourth electrode pair, the fourth electrode pair defines a fourth distance between the electrodes of the fourth electrode pair, the fourth distance shorter than and residing within the second distance, and the fourth electrode pair shares exactly one electrode with the second electrode pair; and calculating an electric field strength at a fourth point between the fourth electrode pair, the fourth point at a different location than the first, second, or third point.

9. The method of claim 8 wherein determining the electric field further comprises:

measuring voltage across a fifth electrode pair, the fifth electrode pair defines a fifth distance between the electrodes of the fifth electrode pair, the fifth distance shorter than and residing within the first distance, the fifth electrode pair shares exactly one electrode with the first electrode pair, the fifth electrode pair does not share an electrode with the third electrode pair, and the fifth distance partially overlaps the third distance;

calculating an electric field strength at a fifth point between the fifth electrode pair, the fifth point at a different location than the first or third point;

measuring voltage across a sixth electrode pair, the sixth electrode pair defines a sixth distance between the electrodes of the sixth electrode pair, the sixth distance shorter than and residing within the second distance, the sixth electrode pair shares exactly one electrode with the second electrode pair, the sixth electrode pair does not share an electrode with the fourth electrode pair, and the sixth distance partially overlaps the fourth distance; and calculating an electric field strength at a sixth point between the sixth electrode pair, the sixth point at a different location than the second or fifth point.

10. The method of claim 6 wherein determining the electric field further comprises:

measuring voltage across a third electrode pair, the third electrode pair defines a third distance between the electrodes of the third electrode pair, the third distance shorter than and residing within the first distance, the third distance partially overlaps the second distance, and the third electrode pair shares exactly one electrode with the first electrode pair;

calculating an electric field strength at a third point between the third electrode pair, the third point at a different location than the first or second point;

measuring voltage across a fourth electrode pair, the fourth electrode pair defines a fourth distance between the electrodes of the third electrode pair, the fourth distance shorter than and residing within the first distance, the fourth distance partially overlaps the first distance, and the third electrode pair shares exactly one electrode with the first electrode pair; and calculating an electric field strength at a fourth point between the fourth electrode pair, the fourth point at a different location than the first, second, or third point.

11. The method of claim 10 wherein determining the electric field further comprises:

measuring voltage across a fifth electrode pair, the fifth electrode pair defines a fifth distance between the electrodes of the fifth electrode pair, the fifth distance shorter than and residing within the first distance, the fifth distance partially overlaps the third distance, the fifth distance partially overlaps the second distance, the fifth electrode pair shares exactly one electrode with the first electrode pair, and the fifth electrode pair does not share an electrode with the third electrode pair;

calculating an electric field strength at a fifth point between the fifth electrode pair, the fifth point at a different location than the first or third point;

measuring voltage across a sixth electrode pair, the sixth electrode pair defines a sixth distance between the electrodes of the sixth electrode pair, the sixth distance shorter than and residing within the second distance, the sixth distance partially overlaps the first distance and the third distance, the sixth electrode pair shares exactly one electrode with the second electrode pair, and the sixth electrode pair does not share an electrode with the fourth electrode pair; and calculating an electric field strength at a sixth point between the sixth electrode pair, the sixth point at a different location than the second or fifth point.

12. The method of claim 6, further comprising producing a geophysical data product from the electric field strength at the second point.

13. The method of claim 6, further comprising recording the geophysical data product on a tangible, non-volatile computer-readable medium suitable for importing onshore.

14. The method of claim 6, further comprising performing geophysical analysis onshore on the geophysical data product.

15. A streamer cable comprising:

an exterior surface, an interior volume, a proximal end, a distal end, and a length;

a first electrode exposed on the exterior surface of the streamer cable, the first electrode at a first location along the streamer cable;

a second electrode exposed on the exterior surface, the second electrode at a second location along the streamer cable;

a first sensor module electrically coupled to the first electrode and second electrode, the first sensor module configured to measure a voltage across the first and second electrodes;

a third electrode exposed on the exterior surface, the third electrode disposed at a third location along the streamer cable, the third location distal to the second electrode;

a second sensor module electrically coupled to the second electrode and third electrode, the second sensor module configured to measure a voltage across the second and third electrodes;

a fourth electrode exposed on the exterior surface, the fourth electrode at a fourth location along the streamer cable, the fourth location distal to the third location; and a third sensor module electrically coupled to the third electrode and fourth electrode, the third sensor module configured to measure a voltage across the third and fourth electrodes.

16. The streamer cable of claim 15 further comprising:
a fifth electrode exposed on the exterior surface, the fifth electrode at a fifth location along the streamer cable between the second and third electrodes;
a sixth electrode exposed on the exterior surface, the sixth electrode at a sixth location along the streamer cable between the fifth and third electrodes;
said first sensor module electrically coupled to the fifth electrode, the first sensor module configured to measure a voltage across the first and fifth electrodes;
said second sensor module electrically coupled to the fifth and sixth electrodes, the second sensor module configured to measure a voltage across the second and sixth electrodes, and configured to measure the voltage across the fifth and third electrodes; and
said third sensor module electrically coupled to the sixth electrode, the third sensor module configured to measure a voltage across the sixth and fourth electrodes.

17. The streamer cable of claim 16 further comprising:
a seventh electrode exposed on the exterior surface, the seventh electrode at a seventh location along the streamer cable proximal to the first electrode;
said first sensor module electrically coupled to the seventh electrode, the first sensor module configured to measure a voltage across the seventh and second electrodes, and the first sensor module configured to measure a voltage across the seventh and fifth electrodes;
an eight electrode exposed on the exterior surface, the eighth electrode at an eighth location distal to the fourth electrode; and
said third sensor module electrically coupled to the eighth electrode, the third sensor module configured to measure a voltage across the sixth and eighth electrodes, and the third sensor module configured to measure a voltage across the third and eighth electrodes.

18. A method comprising:
determining electric field along a streamer cable, the determining by:
measuring voltage across a first electrode pair, the first electrode pair defines a first distance between the electrodes;
calculating an electric field strength at a first point between the first electrode pair;
measuring voltage across a second electrode pair, the second electrode pair defines a second distance between the electrodes of the second electrode pair, the second electrode pair shares exactly one electrode with the first electrode pair, and measuring voltage across the second electrode pair simultaneous with measuring voltage across the first electrode pair;
calculating an electric field strength at a second point between the second electrode pair, the second point at a different location than the first point;
measuring voltage across a third electrode pair, the third electrode pair defines a third distance between the electrodes of the third electrode pair, the third electrode pair shares exactly one electrode with the second electrode pair, and the third electrode pair does not share an electrode with the first electrode pair; and calculating an electric field strength at a third point between the third electrode pair, the third point at a different location than the first and second points.

19. The method of claim 18 wherein determining the electric field further comprises:
measuring voltage across a fourth electrode pair, the fourth electrode pair defines a fourth distance between the electrodes of the fourth electrode pair, the fourth distance longer than the first distance, and the fourth electrode pair shares exactly one electrode with the first electrode pair;
calculating an electric field strength at a fourth point between the fourth electrode pair, the fourth point at a different location than the first or second point;
measuring voltage across a fifth electrode pair, the fifth electrode pair defines a fifth distance between the electrodes of the fifth electrode pair, the fifth distance shorter than and residing within the second distance, and the fifth electrode pair shares exactly one electrode with the second electrode pair;
calculating an electric field strength at a fifth point between the fifth electrode pair, the fifth point at a different location than the second point;
measuring voltage across sixth electrode pair, the sixth electrode pair defines a sixth distance between the electrodes of the sixth electrode pair, the sixth distance longer than the third distance, and the sixth electrode pair shares exactly one electrode with the third electrode pair; and
calculating an electric field strength at a sixth point between the sixth electrode pair, the sixth point at a different location than the third point.

20. The method of claim 19 wherein determining the electric field further comprises:
measuring voltage across a seventh electrode pair, the seventh electrode pair defines a seventh distance between the electrodes of the seventh electrode pair, the seventh distance shorter than and residing within the second distance, and the seventh electrode pair shares exactly one electrode with the second electrode pair; and
calculating an electric field strength at a seventh point between the seventh electrode pair, the seventh point at a different location than the second or fifth point.

21. The method of claim 20 wherein determining the electric field further comprises:
measuring voltage across an eighth electrode pair, the eighth electrode pair defines an eighth distance between the electrodes of the eighth electrode pair, the eighth distance longer than first distance, and the eighth electrode pair shares exactly one electrode with the fourth electrode pair;
calculating an electric field strength at an eighth point between the eighth electrode pair, the eighth point at a different location than the first or fourth point;
measuring voltage across a ninth electrode pair, the ninth electrode pair defines a ninth distance between the electrodes of the ninth electrode pair, the ninth distance longer than the eighth distance, and the ninth electrode pair shares exactly one electrode with the eighth electrode pair;
calculating an electric field strength at a ninth point between the ninth electrode pair, the ninth point at a different location than the first, fourth, or eighth point;
measuring voltage across a tenth electrode pair, the tenth electrode pair defines a tenth distance between the electrodes of the tenth electrode pair, the tenth distance longer than the third distance, and the tenth electrode pair shares exactly one electrode with the third electrode pair;

calculating an electric field strength at a tenth point between the tenth electrode pair, the tenth point at a different location than the third or sixth point;

measuring voltage across an eleventh electrode pair, the eleventh electrode pair defines an eleventh distance between the electrodes of the eleventh electrode pair, the eleventh distance longer than the tenth distance, and the eleventh electrode pair shares exactly one electrode with the tenth electrode pair; and calculating an electric field strength at an eleventh point between the eleventh electrode pair, the eleventh point at a different location than the third, sixth, or tenth point.

22. The method of claim 18, further comprising producing a geophysical data product from the electric field strength at the third point.

23. The method of claim 18, further comprising recording the geophysical data product on a tangible, non-volatile computer-readable medium suitable for importing onshore.

24. The method of claim 18, further comprising performing geophysical analysis onshore on the geophysical data product.

* * * * *